(12) United States Patent
Boyd et al.

(10) Patent No.: US 6,656,319 B1
(45) Date of Patent: Dec. 2, 2003

(54) FLUID-ACTIVATABLE ADHESIVE ARTICLES AND METHODS

(75) Inventors: William C. Boyd, White Bear Lake, MN (US); Joseph M. McGrath, Lake Elmo, MN (US); Albert I. Everaerts, Oakdale, MN (US); Laura J. Maursetter, Willmar, MN (US); Lang N. Nguyen, St. Paul, MN (US); Deana A. Klein, Maplewood, MN (US); Thomas A. Kotnour, Faribault, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 273 days.

(21) Appl. No.: 09/697,007

(22) Filed: Oct. 25, 2000

(51) Int. Cl.⁷ .......................... B32B 31/06; B32B 31/12
(52) U.S. Cl. .................. 156/305; 156/212; 156/308.6; 156/309.3
(58) Field of Search .............................. 156/305, 308.2, 156/308.6, 308.8, 309.3, 212, 215

(56) References Cited

U.S. PATENT DOCUMENTS

| | | | |
|---|---|---|---|
| 2,736,721 A | 2/1956 | Dexter ........................ 260/42 |
| 3,301,741 A | * 1/1967 | Henrickson et al. |
| 3,314,838 A | 4/1967 | Erwin ......................... 156/71 |
| 3,681,179 A | 8/1972 | Theissen ........................ 161/4 |
| 3,691,140 A | 9/1972 | Silver ........................ 260/78.5 |
| 4,025,159 A | 5/1977 | McGrath ..................... 350/105 |
| 4,166,152 A | 8/1979 | Baker et al. ................ 428/522 |
| 4,248,748 A | 2/1981 | McGrath et al. .......... 260/27 R |
| 4,376,151 A | 3/1983 | Parrotta ...................... 428/323 |
| 4,556,595 A | * 12/1985 | Ochi |
| 4,735,837 A | 4/1988 | Miyasaka et al. ............. 428/40 |
| 4,746,382 A | * 5/1988 | Logan ................ 156/308.6 X |
| 4,896,943 A | 1/1990 | Tolliver et al. ............. 350/105 |
| 4,946,742 A | * 8/1990 | Landin |
| 5,050,529 A | * 9/1991 | Pardee |

(List continued on next page.)

FOREIGN PATENT DOCUMENTS

| | | |
|---|---|---|
| EP | 0 166 801 | 1/1986 |
| EP | 0 279 579 | 8/1988 |
| EP | 0 429 269 | 5/1991 |
| EP | 0 708 162 | 4/1996 |
| GB | 2 285 467 | 7/1995 |
| GB | 2 286 781 | 8/1995 |
| JP | 5112759 | 5/1993 |
| WO | WO 91/06424 | 5/1991 |
| WO | WO 94/00525 | 1/1994 |
| WO | WO 96/26221 | 8/1996 |
| WO | WO 7/07991 | 3/1997 |
| WO | WO 98/17466 | 4/1998 |
| WO | WO 99/24671 | 5/1999 |
| WO | WO 99/34240 | 7/1999 |
| WO | WO 00/56830 | 9/2000 |
| WO | 00/56830 | * 9/2000 |

OTHER PUBLICATIONS

*Handbook of Pressure Sensitive Adhesive Technology* pp. 173–173, (Donatas Satas, Ed.), 2ⁿᵈ Edition, Von Nostrand Rheinhold, New York, 1989.

3M Brochure, "Cutting, Matchieng, Premasking and Prespacing of 3M™ Scotchlite™ Reflective Sheetings and Films", pp. 1–8, Information Folder 1.10, Apr., 1998.

U.S. patent application Ser. No. 09/697,008, Everaerts, filed Oct. 25, 2000.

U.S. patent application Ser. No. 09/697,005, Everaerts, filed Oct. 25, 2000.

*Primary Examiner*—Curtis Mayes
(74) *Attorney, Agent, or Firm*—Carolyn A. Fischer

(57) ABSTRACT

Adhesive articles and methods of applying and activating adhesive articles to bond to substrates using a fluid application aid. Preferably, the substrates are traffic devices such as traffic cones and the adhesive articles are retroreflective cone collars or sleeves.

18 Claims, 2 Drawing Sheets

U.S. PATENT DOCUMENTS

| | | | |
|---|---|---|---|
| 5,064,272 A | | 11/1991 | Bailey et al. ................ 359/541 |
| 5,066,098 A | | 11/1991 | Kult et al. .................. 359/540 |
| 5,069,964 A | * | 12/1991 | Tolliver et al. |
| 5,138,488 A | | 8/1992 | Szczech ...................... 359/529 |
| 5,209,971 A | | 5/1993 | Babu et al. ................. 428/343 |
| 5,214,119 A | | 5/1993 | Leir et al. ..................... 528/28 |
| 5,236,751 A | * | 8/1993 | Martin et al. |
| 5,238,736 A | | 8/1993 | Tseng et al. ................ 428/327 |
| 5,262,225 A | | 11/1993 | Wilson et al. .............. 428/203 |
| 5,271,766 A | | 12/1993 | Koutlakis et al. ........... 106/213 |
| 5,296,277 A | | 3/1994 | Wilson et al. ................. 428/40 |
| 5,346,766 A | | 9/1994 | Otter et al. ................. 428/355 |
| 5,362,516 A | * | 11/1994 | Wilson et al. |
| 5,450,235 A | | 9/1995 | Smith et al. ................ 359/529 |
| 5,487,929 A | | 1/1996 | Rusincovitch, Jr. et al. .. 428/40 |
| 5,605,761 A | | 2/1997 | Burns et al. ................. 428/412 |
| 5,614,286 A | | 3/1997 | Bacon, Jr. et al. .......... 428/161 |
| 5,629,087 A | | 5/1997 | Hartman et al. ............ 428/355 |
| 5,639,539 A | | 6/1997 | DeProspero et al. ........ 428/195 |
| 5,686,180 A | | 11/1997 | Rivlin et al. ................ 428/350 |
| 5,784,198 A | | 7/1998 | Nagaoka ..................... 359/534 |
| 5,795,636 A | * | 8/1998 | Keller et al. |
| 5,925,453 A | | 7/1999 | Kase et al. ................. 428/323 |
| 6,004,308 A | | 12/1999 | Haddock .................... 604/390 |
| 6,020,062 A | * | 2/2000 | Questel et al. |
| 6,083,616 A | * | 7/2000 | Dressler |
| 6,197,397 B1 | * | 3/2001 | Sher et al. |

\* cited by examiner

FLUID-ACTIVATABLE ADHESIVE ARTICLES AND METHODS

FIELD OF THE INVENTION

This invention relates to adhesive articles and methods of applying and activating the adhesive articles to adhere to substrates using a fluid application aid. Preferably, the substrates are traffic devices such as traffic cones and the adhesive articles are retroreflective cone collars or sleeves.

BACKGROUND

Traffic devices are used to channel traffic, divide opposing traffic lanes, divide traffic lanes when two or more lanes are kept open in the same direction, and delineate the boundaries of temporary maintenance and utility work zones. The term "traffic device" includes, but is not limited to, bodies such as cones that are integrally formed from a flexible material that can be struck by a moving vehicle without significantly damaging the vehicle on impact, and having a base portion for supporting an upright member, preferably a conical or cylindrical member. Examples of traffic devices include cones, drums, tubes, stakes, and posts.

A common method of enhancing the visibility of such a traffic device, such as a traffic cone, is to adhesively apply reflectorized sheeting material to the exterior of the upright member in order to enhance the visibility of the traffic cone at night or other times of poor visibility. Typically, traffic cones for use on freeways include one or more reflective bands, which typically are formed from reflective sheeting, preferably retroreflective sheeting, adhered to the cone.

Such reflective sheeting may be applied manually, but such a process is slow and therefore expensive and requires considerable skill if speed and accuracy are desired. One such approach is to place a non-adhesive coated collar of retroreflective material over the cone after an adhesive has been applied to the cone, generally by brushing on a liquid adhesive. This is a messy procedure, labor intensive, does not assure 100% coverage of adhesive between the cone collar and the cone, and leaves adhesive residue that needs to be cleaned off the cone and cone collar. Stacking cones before the adhesive is dried is not recommended. A second approach is to apply a flat cone sleeve, which has adhesive coated on it, to the cone. This requires mechanical application equipment or great skill and care to get the retroreflective sheeting correctly placed on the cone without wrinkles.

What is needed is a method of applying adhesive articles, such as cone collars, quickly and easily to substrates, such as traffic cones. Although pressure sensitive adhesives (PSAs) would provide quicker and easier application, PSA articles are often difficult to apply to a substrate in a precise location and without air entrapment, primarily due to preadhesion or "quick stick" behavior of the PSA. This is particularly true for "aggressive" PSAs that have high bond strengths and/or low temperature tack properties. Several methods and configurations have been developed to make application of PSA films and tapes easier.

For example, application aids such as detergent and water have been used to eliminate preadhesion. Formulations vary, but typically include water, a surfactant or lubricant, and a solvent (generally, an alcohol), the latter of which may speed bond formation and drying. The liquids tend to form a film between the adhesive and substrate, thus preventing contact and preadhesion. Unfortunately, most fluid application aids adversely affect the adhesive properties and prevent rapid formation of a strong bond between adhesive and substrate.

Dry application aids, such as particles, powders, or talcs are also useful in preventing preadhesion. While these techniques make application very easy and provide for easy positioning and repositioning, formation of a strong adhesive bond to the substrate is slow.

Certain conventional products use a random distribution of hollow glass microspheres partially embedded in the adhesive or nonadhesive spaced-apart posts as a means to prevent contact and preadhesion. Alternatively, a similar configuration is known in which the tops of the hollow microspheres protruding from the adhesive surface are coated by a thin layer of PSA. Pressure application crushes the microspheres permitting the adhesive to contact the substrate and form a strong bond instantly.

Microsphere and patterned adhesives have also been reported that exhibit repositionable properties. Deformable microspheres impart a rough or pebble-like surface and repositionable bond. In these cases, the adhesive films readily form weak, repositionable bonds to a substrate, but do not form a strong, permanent bond.

Topologically structured adhesives have also been described. For example, relatively large scale embossing of an adhesive has been described to permanently reduce the PSA/substrate contact area and hence the bonding strength of the PSA. Various adhesive layer topologies include concave and convex v-grooves or hemispheres, and other three dimensional shapes.

Although each of these methods could provide advantageous application of adhesive articles to substrates, other adhesive articles and methods are needed for application of adhesive articles, such as cone collars, to substrates, such as traffic cones.

SUMMARY

This invention relates to adhesive articles and methods of applying and activating the adhesive articles to adhere to substrates. The adhesive article includes a surface on which is disposed an adhesive with a plurality of protrusions. The protrusions can be in the form of particles disposed on the adhesive surface (e.g., on a layer of adhesive). Alternatively, the adhesive can have a topologically structured adhesive surface such that the protrusions are a part of the adhesive layer. In yet another embodiment, the protrusions (referred to as "structured features" in this embodiment) can be provided by fibers, particularly a fibrous woven or nonwoven web disposed on the adhesive surface. The methods involve applying the adhesive article to a substrate, positioning it, and allowing it to adhere to the substrate using a fluid (e.g., water, organic solvent, or a plasticizer) as an application aid. The application aid is a fluid at the temperature of application and/or activation of the adhesive article. That is, the application aid can be applied as a solid, and the temperature increased to melt the solid and form a fluid application aid. Although the fluid application aid is typically a liquid at the temperature of activation of the adhesive article, it is envisioned that it could also be a gas.

As used herein, a fluid application aid is applied to assist in activating the adhesive article to adhere to a substrate, and optionally, to assist in applying the adhesive article to the substrate. The fluid application aid could activate or temporarily deactivate the adhesive properties of the adhesive. It could also, or alternatively, activate or temporarily deactivate the adhesive properties of the protrusions (if they have such properties). The fluid application aid may temporarily decrease the adhesion and then allow the adhesion to build. The fluid application aid may be applied before or after the adhesive article and substrate come in contact with each other. Although such activation can occur by a variety of mechanisms, as long as there is an increase in the adhesion between the adhesive article and the substrate upon applying an application aid to the interface between the substrate and adhesive article, the method is within the scope of the present invention.

Preferably, an adhesive article according to the present invention is a retroreflective cone collar (i.e., sleeve) having an adhesive that facilitates correct positioning of the collar or sleeve on traffic cones, such as plasticized polyvinyl chloride (PVC), and further develops good adhesion to the cones over time. Although the present invention is preferably directed to traffic devices such as traffic cones and adhesive retroreflective cone collars (i.e., sleeves), the invention is not limited to such articles and substrates.

In one embodiment, the present invention provides a method of adhering an adhesive article to a substrate. The method includes: providing an adhesive article comprising a surface on which is disposed an adhesive with a plurality of protrusions; applying the adhesive article to a substrate (preferably, a flexible polymeric substrate) to form an interface between the adhesive and the substrate; and providing a fluid application aid to the interface between the adhesive and the substrate to promote adhesion between the adhesive article and the substrate. Preferably, the protrusions are in the form of particles disposed on the adhesive surface. A preferred group of particles include silica, talc, starch, glass, alumina, calcium carbonate, zeolites, nontacky adhesive precursor particles, and combinations thereof. Alternatively, the adhesive has a topologically structured surface with structured features.

In another embodiment, the invention provides a method of adhering an adhesive article to a substrate. The method includes: providing an adhesive article that includes a surface on which is disposed an adhesive (preferably, a plasticizer-activatable adhesive) with a plurality of protrusions provided by particles, fibers, a fibrous web, or combinations thereof; applying the adhesive to article to a substrate to form an interface between the adhesive and the substrate; and providing a fluid application aid to the interface between the adhesive and the substrate to promote adhesion between the adhesive article and the substrate. Preferably, the fluid application aid includes water and a surfactant. If desired, providing a fluid application aid to the interface between the adhesive and the substrate occurs simultaneously with applying the adhesive article to the substrate to form the interface. The fluid application aid can be provided to the adhesive article, the substrate, or both prior to applying the adhesive article to the substrate. Alternatively, the fluid application aid can migrate out of the substrate to which the adhesive article is applied (but typically not the backing that forms a part of the adhesive article).

Another embodiment of the invention is a method of adhering an adhesive article to a substrate that includes: providing an adhesive article that includes a surface on which is disposed a plasticizer-activatable adhesive with a plurality of plasticizer-activatable adhesive protrusions; applying the adhesive article to a substrate to form an interface between the adhesive and the substrate; and providing a fluid application aid to the interface between the adhesive and the substrate to promote adhesion between the adhesive article and the substrate.

The present invention also provides articles. In one embodiment, there is provided a retroreflective article that includes a retroreflective surface forming an exposed outer viewing surface, and an opposing surface (i.e., an outer surface of the article) on which is disposed a fluid-activatable adhesive with a plurality of fluid-activatable adhesive protrusions. Preferably, the fluid-activatable adhesive and fluid-activatable protrusions are plasticizer-activatable. Preferably, they are both prepared from the same or different plasticizer-activatable pressure sensitive adhesives.

Another embodiment is a retroreflective article that includes a retroreflective surface forming an exposed outer viewing surface, and an opposing surface on which is disposed an adhesive with a plurality of fluid-activatable protrusions. These protrusions are preferably plasticizer activatable, and more preferably prepared from plasticizer activatable adhesives.

Yet another embodiment is a retroreflective article that includes a retroreflective surface forming an exposed outer viewing surface, and an opposing surface on which is disposed a layer of an adhesive with a plurality of nontacky particles disposed thereon, wherein the nontacky particles are selected from the group of silica, talc, starch, glass, alumina, calcium carbonate, zeolites, nontacky adhesive precursor particles, and combinations thereof.

Another embodiment is a retroreflective article that includes a retroreflective surface forming an exposed outer viewing surface, and an opposing surface on which is disposed an adhesive with a plurality of fluid-activatable protrusions comprising fibers or a fibrous web.

Also are provided traffic devices, such as traffic cones, that include these retroreflective articles, which are preferably in the form of sheeting.

As a result of the present invention, cycle time to make, reflectorize, stack, package, and ship traffic devices such as cones, as well as labor, time, and costs are significantly reduced.

In this application:
"adhesive" refers to the adhesive composition, and may also refer to the adhesive layer of an adhesive article; it includes compositions that may or may not have adhesive properties at room temperature or temperature at which an article is applied to a substrate, but have adhesive properties upon activation (hence, an adhesive precursor is included within the term adhesive);

"particle" refers to particulate material that may be spherical, cubic, irregularly shaped, solid, porous, hollow, elastic, inelastic, adhesive, nonadhesive, tacky, or nontacky;

"positionable" means an adhesive surface can be placed against a substrate surface and easily slid over the surface into proper position without significantly preadhering to the substrate;

"substantially uniformly distributed" means the unit average density of protrusions on the functional portion of the adhesive surface is uniform over the adhesive surface in a regular or random pattern as is necessary to make that adhesive surface positionable;

"substrate" means the surface upon which an adhesive article is applied; and

"tack" or "tacky" means instant contact adhesion between the adhesive and the substrate, which may be substrate specific ("no tack" or "nontacky" means that there is no such instant contact adhesion between the adhesive and the substrate).

BRIEF DESCRIPTION OF THE DRAWINGS

The invention will be further explained with reference to the drawings, wherein.

Figure 1:
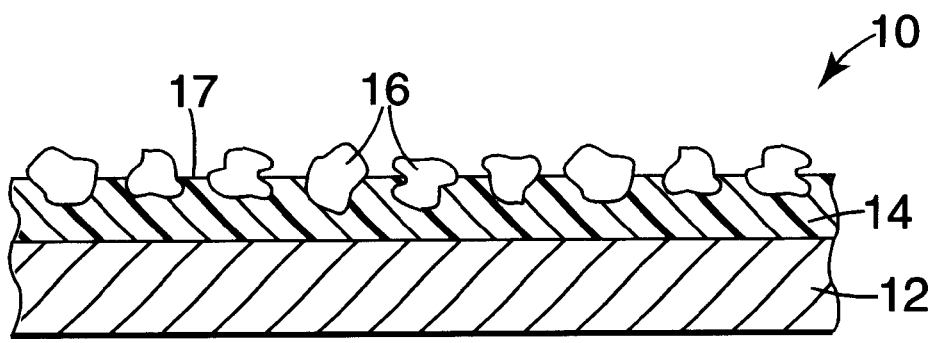
FIG. 1 is a planar cross-sectional schematic of one embodiment of an adhesive article of the present invention showing particles disposed on an adhesive layer.

These figures, which are idealized, are not to scale and are intended to be merely illustrative and non-limiting.

DETAILED DESCRIPTION OF PREFERRED EMBODIMENTS

This invention relates to adhesive articles and methods of applying and activating the adhesive articles to adhere to substrates. Although the present description is primarily directed to traffic devices such as traffic cones and adhesive retroreflective cone collars (i.e., sleeves), the invention is not limited to such articles and substrates. A wide variety of adhesive articles, whether in sheet form or not, and substrates, whether made of a flexible polymer or not, can be adhered together using the advantageous adhesive system of the present invention, whether they are at room temperature or not.

The adhesive article includes a surface on which is disposed an adhesive with a plurality of protrusions. This combination of adhesive and protrusions is referred to herein as the "adhesive system." The protrusions assist in making the adhesive article positionable, although the fluid application aid may also contribute to an adhesive article's positionability. They are preferably nonfragile protrusions (i.e., protrusions that do not crush or crumble under typical hand pressure used during application, which is typically a shearing force rather than a force normal to the adhesive article). Thus, pressure is not typically used (or needed) to activate the adhesive; rather, a fluid can activate the adhesive and/or protrusions (either through washing the protrusions away, converting them to a tacky state, swelling the underlying adhesive, etc.). This is in contrast to certain conventional products that include a random distribution of hollow glass microspheres or spaced-apart posts that prevent contact and preadhesion, but then require the application of pressure to crush the microspheres/posts and permit the adhesive to contact the substrate and form a strong bond instantly.

The protrusions can be in the form of particles or fibers, the latter of which can be in the form of a woven or nonwoven web, disposed on the adhesive surface. Alternatively, the adhesive can have a topologically structured adhesive surface such that the protrusions are a part of the adhesive layer. Thus, as used herein, the phrase "a plurality of protrusions on the adhesive surface" includes particles, fibers, and fibrous webs (i.e., mats) that are applied to the surface of the adhesive, as well as protrusions that are part of the adhesive surface. As a result, the protrusions can be tacky or nontacky, preferably, they are nontacky at the desired application temperature. If particles are used, they can be of the same material as the adhesive or of a different material, which can be an adhesive or a nonadhesive. Preferably, they are nonadhesive particles. For example, the particles can be talc, silica, glass beads, starch, nontacky adhesive precursor particles, etc. The protrusions can be randomly or uniformly dispersed over the surface. They can be in the form of ridges or various designs and geometric shapes. Preferably, the particles are selected from the group of silica, talc, starch, glass, alumina, calcium carbonate, zeolites, nontacky adhesive precursor particles, and combinations thereof. Useful techniques for coating such particulate material include fluidized-bed coating and electrostatic spray processes, for example.

Preferably, an adhesive article includes a sheeting material having two major surfaces, one of which has an adhesive disposed thereon with a plurality of protrusions on the adhesive surface. The sheeting typically forms a sleeve (i.e., collar) for use around a traffic control device. The protrusions are used to reduce the contact area of the functional surface (i.e., the surface that contacts the substrate) of the adhesive article. Preferably, the protrusions temporarily deactivate or mask the adhesive. As a result, the adhesive system is generally positionable and the adhesive article can be more readily applied to a substrate. For example, a preformed sleeve can be more readily applied to a traffic cone into the correct position without expensive application equipment. Alternatively, a flat cone sleeve can be more easily wrapped around a cone into the correct position without expensive application equipment. Guide lines could be molded into the cone to assist the application or a simple conical tool resting over the top portion of the cone could be used to guide the application process.

In the methods of the present invention, the adhesive is activated to adhere the article to the substrate using a fluid application aid. That is, the fluid, such as water or a plasticizer, for example, functions to facilitate adhesion of the article to the substrate. Although not intending to be limiting, it is believed that this occurs by removing or engulfing the protrusions, masking the function of the protrusions, by converting nontacky protrusions to a tacky adhesive, or various combinations of these mechanisms. Although such activation can occur by a variety of mechanisms, as long as there is an increase in the adhesion between the adhesive article and the substrate upon applying a fluid application aid to the interface between the substrate and adhesive article, the method is within the scope of the present invention. The fluid application aid can also function to assist in positioning the adhesive article on the substrate. Thus, the application aid can be applied before, during, or after the adhesive article comes in contact with the substrate. Depending on its formulation, the application aid may need to be removed, as by evaporation, before the adhesive can be activated to adhere to the substrate.

The fluid application aid can be applied from an external source or it can migrate out of the substrate to contact the protrusions. For example, water can be applied from an external source to wash away the particles. Alternatively, a plasticizer can be applied from an external source, or a plasticizer from the substrate, such as a plasticized polyvinyl chloride substrate, can migrate out of the substrate to activate plasticizer-activatable particles and/or the nonprotruding adhesive (e.g., underlying layer of adhesive) if it is plasticizer-activatable. Although not intending to be limiting, it is believed that the nonprotruding adhesive (i.e., the adhesive that forms an underlying layer or that forms regions between the protrusions) may absorb the plasticizer and swell to engulf the protrusions. Although a plasticizer-activatable adhesive can be activated by plasticizer provided by the substrate to which the adhesive article is to be attached, it may be necessary to also add additional plasticizer from an external source to more efficiently activate the adhesive article to adhere to the substrate.

Preferably, the adhesive article is a reflective article, and more preferably, a retroreflective article, and most preferably, retroreflective sheeting. Preferably, the retroreflective sheeting has a retroreflective surface, which is the exposed outer viewing surface, and an opposing surface having the adhesive disposed thereon, which is usually positioned against the outer surface of the traffic device.

Figure 2:
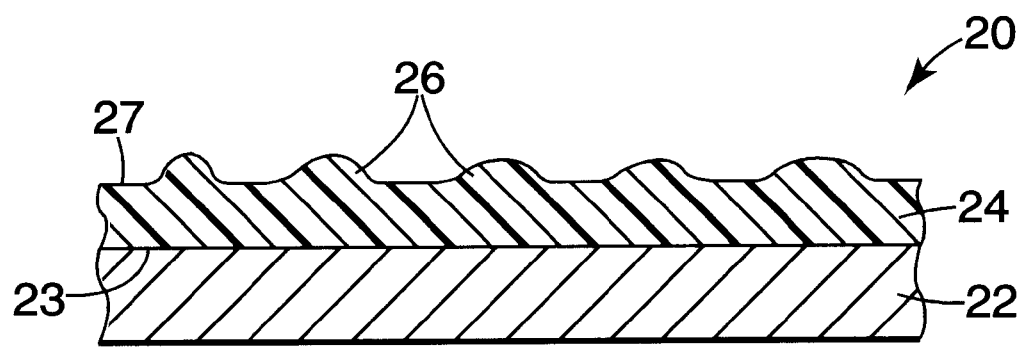
FIG. 2 is a planar cross-sectional schematic of another embodiment of an adhesive article of the present invention showing topologically structured features in the adhesive layer.

Referring to FIG. 1, an adhesive sheet 10 is illustrated that includes a backing 12, attached to an adhesive layer 14, wherein adhesive layer 14 includes spaced-apart, preferably, uniformly spaced-apart, particles 16 protruding above adhesive layer surface 17. Referring to FIG. 2, an adhesive sheet 20 is illustrated that includes a backing 22, attached to an adhesive layer 24, wherein adhesive layer 24 includes spaced-apart, preferably uniformly spaced-apart topologically structured features 26 protruding above adhesive layer surface 27. Adhesive layer 24 can be further overlaid with a liner (not shown) that includes spaced-apart depressions. Typically, during fabrication of adhesive sheet 20, adhesive layer 24 is coated onto the liner, wherein the adhesive mixture is allowed to flow into the depressions. Backing 22 is then laminated to the planar surface 23 of adhesive layer 24 and the liner is removed to form the protrusions.

Referring to FIGS. 1 and 2, although backing 12, 22 is illustrated as a single ply, backing 12, 22 can include multiple plies of thermoplastic materials, additional adhesive layers, primer layers, protective coatings, barrier layers, and any other structures and combination of structures known to those skilled in the art, such as sign sheeting, transfer or release liners, transfer tapes, adhesive-coated foams, woven and non-woven sheets, paper, and metal foils. Preferably, backing 12, 22 is a representation of a back (outer) surface of a retroreflective sheeting.

For most uses, adhesive layer 14, 24 of the adhesive sheet 10, 20 should be at least 25 microns in thickness in order to conform to irregularities in substrates to which it may be applied. Protrusions 16, 26 may be substantially uniformly distributed on the entire functional portion of adhesive layer surface 17, 27. Alternatively, they can be distributed over only a portion thereof. For example, protrusions can be along only one edge of a wide sheet or tape to allow precise positioning of that edge, after which the rest of the sheet can be pressed into place and needs no protrusions. Thus, the adhesive and protrusions can be present on only a portion of a surface of the adhesive article. Preferably, however, the adhesive and protrusions cover substantially all of at least one major surface of the adhesive article. It is also within the scope of the present invention to have a protrusion-density gradient from top to bottom, side to side, convergent or divergent to the center of the adhesive article, etc.

The use of protrusions on the functional surface of the adhesive not only allows for positionability of the adhesive article on the substrate, but may eliminate the need for a liner. The ability to produce an adhesive article without a liner results in significant cost reduction, waste reduction, application time reduction, and storage volume reduction.

Also, in applications in which a retroreflective sheeting is applied to a traffic device, the sheeting can be applied to a device that can be at a wide range of temperatures. This presents a significant advantage in manufacturing.

For particularly preferred embodiments, the adhesive article is a retroreflective collar (i.e., sleeve) having an adhesive system that provides for correct positioning of the collar or sleeve on traffic cones, preferably, plasticized polyvinyl chloride (PVC) traffic cones, and further develops good adhesion to the cones (or other traffic devices) over time. Preferably, such articles have a layer of an adhesive, more preferably, a layer of a plasticizer-activatable or plasticizer-tolerant pressure sensitive adhesive, most preferably, a layer of a plasticizer-activatable pressure sensitive adhesive, with a powdered form of a plasticizer-activatable or plasticizer-tolerant pressure sensitive adhesive (preferably, plasticizer-activatable pressure sensitive adhesive) coated thereon, which first comes into contact with the plasticized PVC cone. Plasticizer-activatable adhesives are typically activated by the plasticizer migrating from the PVC, although a plasticizer can be applied to the interface between the adhesive and the substrate from an external source. As used herein, a plasticizer-activatable adhesive is typically latent (i.e., does not have adhesive properties (e.g., is not tacky)) until contacted by a plasticizer, whereas a plasticizer-tolerant adhesive has adhesive properties (e.g., is tacky) that are not completely destroyed upon contact with a plasticizer.

Regardless of the mechanism of activation of the adhesive article, the activated adhesive article is adhered to a substrate to a sufficient extent for the desired use. For example, sufficient adhesion can occur even though the adhesive article can be removed by peeling it from the substrate by hand, if it were destroyed upon sliding it from the substrate. At the very least, if there is any improvement in adhesion between the substrate and the adhesive article after an application aid is applied to the interface between the adhesive article and the substrate, it is within the scope of the methods of the present invention. Preferably, an adhesive article demonstrates an adhesion level to a substrate of at least about 1 pound/inch (179 grams/centimeter), and preferably at least about 3 pounds/inch (536 grams/centimeter), according to a 90° Peel Force Test as specified in the Examples Section. More preferably, for cone collars, a retroreflective sleeve should stay in place after the construction is cooled to 30° F. (−1° C.) and subjected to impact (e.g., hit by a baseball bat one to three times or a car at 55 miles per hour (90 kilometers per hour)).

Thus, in the present invention, an adhesive article includes an adhesive, preferably a layer of adhesive covering substantially all of at least one major surface of the article (e.g., sheeting), and a plurality of protrusions. The adhesive can be a distinct material from that of the protrusions. The adhesive can be tacky at room temperature or the temperature of application, although it can also be nontacky. The protrusions can be formed from distinct particles, fibers, or a fibrous mat that is disposed on the adhesive. Alternatively, the protrusions can be an integral part of the adhesive such that the adhesive and protrusions form a continuous layer. The protrusions can be adhesive or nonadhesive. If they are adhesive, the protrusions can be tacky at room temperature or the temperature of application, although they can also be nontacky. Preferably, the adhesive is a distinct material from that of the protrusions, thereby forming a layer underlying a plurality of particles, fibers, or fibrous mat (i.e., web).

Adhesive Articles

The adhesive articles can be in a variety of shapes and sizes. They can be in the form of sheeting materials for retroreflective and graphics applications, labels, tapes, laminating films, decorative emblems, wall paper, etc. Such adhesive articles can be used on license plates, signage, traffic barriers, reflective clothing and shoes, banners, packaging containers, or applications in which a label or tape or other article needs to be slipped onto a substrate (e.g., as in the attachment of grips to golf clubs). For certain applications, the adhesive articles are heat shrinkable.

Figure 3:
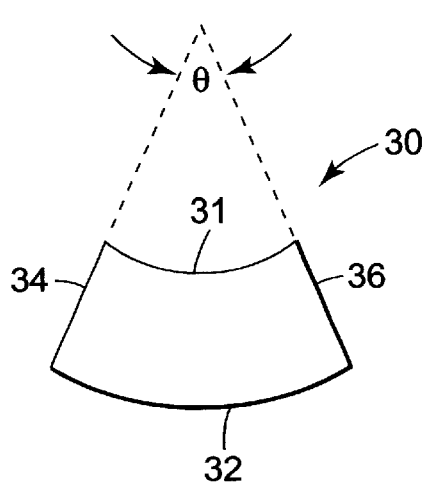
FIG. 3 is a perspective view of one embodiment of retroreflective sheeting of the present invention.

Preferably, the adhesive articles include reflective sheeting, and more preferably, retroreflective sheeting. FIG. 3 shows retroreflective sheeting 30 having an upper edge 31 and a lower edge 32. Both edges 31 and 32 are arcuate so as to form a truncated cone-shaped sleeve that may be applied over the outer surface of a cone-shaped traffic device of the type shown in FIG. 4. Side edges 34 and 36 connect the upper edge 31 to the lower edge 32. Side edges 34 and 36 form an included angle Θ (theta), which for cones is generally at least about 30 degrees and often much larger.

Figure 4:
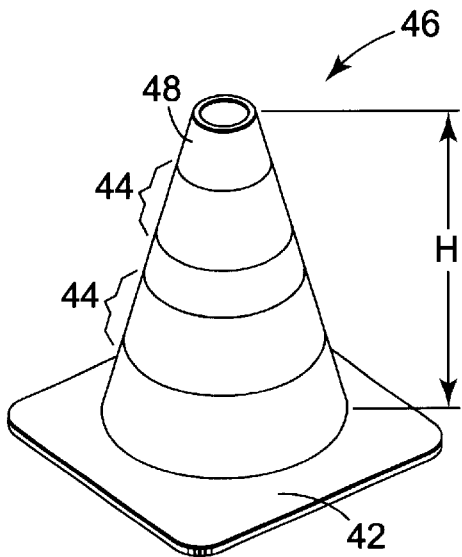
FIG. 4 is a perspective view showing the sheeting of FIG. 3 as a sleeve placed onto a conical-shaped traffic device.

The sheeting may either be formed into a sleeve before it is applied to a traffic or other device, or may just be applied to the device without having been preformed into a sleeve. The sheeting of FIG. 3 may be wrapped to place the opposing side edges 34 and 36 in juxtaposition to form a sleeve 44 (FIG. 4). The sleeve has an inner side or adhering surface (a surface that does not include optical elements) and a retroreflective surface or an outer viewing surface. In FIG. 4, two sleeves are shown after placement on the outer surface of the upright member 48 of a conical traffic device 46 having a height H.

In forming the sleeve, the opposing side edges may be overlapped, spliced so that the edges meet to form a butt joint, or placed so that the edges do not contact each other, but are in close proximity. Alternately, fastening means may be used to hold the sleeve edges in juxtaposition. Both mechanical and/or chemical fastening means may be used to hold the sleeve edges in a wrapped condition prior to placement onto the cone. Chemical means include as examples double stick tape, pressure-sensitive adhesives, and thermal adhesives. Mechanical means include as examples stitching, staples, rivets, brackets, hooks, and hook and loop fasteners. Other fastening means include welding techniques.

Figure 5:
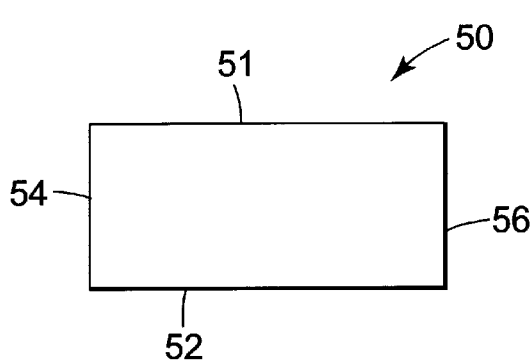
FIG. 5 is a perspective view of a rectangular piece of retroreflective sheeting of the present invention.
Figure 6:
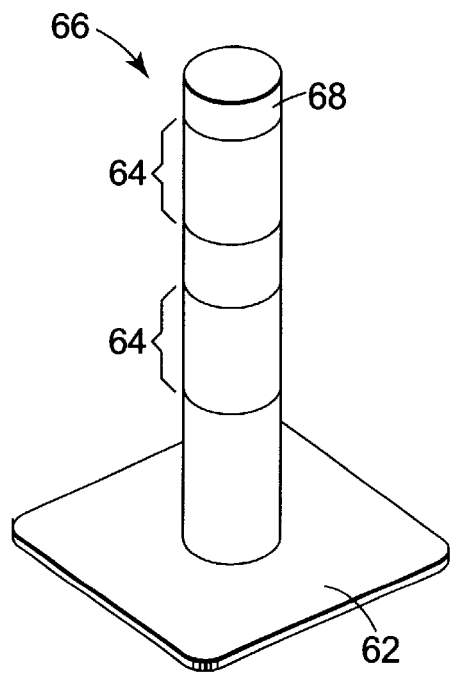
FIG. 6 is a perspective view showing the sheeting of FIG. 5 as a sleeve placed on a cylindrical-shaped traffic device.

If desired, the retroreflective sheeting can include an upper band adjacent the upper edge, a lower band adjacent the lower edge, and a central area that divides the upper band and the lower band. Such retroreflective sheeting designs are described in International Application No. WO 99/24671 (published May 20, 1999). The sleeve of the present invention may also include additional bands above the upper band or below the lower band. For example, the top-most band could be orange, the upper band white, the center band orange, the lower band white, and the lower-most band orange. Other combinations are, of course, also possible. Such sleeves can replace the two sleeves shown in FIG. 4. FIG. 5 shows a generally rectangular piece of retroreflective sheeting 50, which includes an upper edge 51 and a lower edge 52. Both the upper edge and the lower edge are straight and equal in length. If desired, it can include an upper band adjacent to the upper edge, a central area, and a lower band adjacent the lower edge. The sheeting of FIG. 5 may be wrapped to place the side edges 54 and 56 in juxtaposition to form a sleeve 64. In FIG. 6, two sleeves 64 are shown placed on the outer surface of the upright member 68 of a cylindric traffic device 66.

For the preferred cone collars shown on traffic devices (e.g., cones) in FIGS. 4 and 6 and other applications in which retroreflective sheeting is adhesively applied to a substrate, the two most common types of retroreflective sheeting suitable for use are microsphere-based sheeting and cube comer-based sheeting. Microsphere sheeting, sometimes referred to as "beaded sheeting," is well known to the art and includes a multitude of microspheres typically at least partially embedded in a binder layer, and associated specular or diffuse reflecting materials (such as metallic vapor or sputter coatings, metal flakes, or pigment particles). There are also "slurry coated" and lens-based sheetings in which the beads are in spaced relationship to the reflector but in full contact with resin. There are also "exposed lens" retroreflective sheetings in which the reflector is in direct contact with the bead but the opposite side of the bead is in a gas interface. Illustrative examples of microsphere-based sheeting are disclosed in U.S. Pat. Nos. 4,025,159 (McGrath); 4,983,436 (Bailey); 5,064,272 (Bailey); 5,066, 098 (Kult); 5,069,964 (Tolliver); and 5,262,225 (Wilson).

Cube corner sheeting, sometimes referred to as prismatic, microprismatic, or triple mirror reflector sheetings, typically includes a multitude of cube corner elements to retroreflect incident light. Cube corner retroreflectors typically include a sheet having a generally planar front surface and an array of cube corner elements protruding from the back surface. Cube corner reflecting elements include generally trihedral structures which have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be totally internally reflected by the faces of the elements, so as to exit the front surface-in a direction substantially toward the light source. The light rays are typically reflected at the lateral faces due to total internal reflection, or by reflective coatings, as previously described, on the back side of the lateral faces. Illustrative examples of cube corner-based retroreflective sheeting are disclosed in U.S. Pat. Nos. 5,138,488 (Szczech); 5,387,458 (Pavelka); 5,450,235 (Smith); 5,605,761 (Bums); and 5,614,286 (Bacon).

Regardless of the type of retroreflective sheeting, such sheeting has a retroreflective surface, which is the exposed outer viewing surface. The opposing surface is typically the adhering surface, which is usually positioned against the outer surface of the traffic device. The opposing surface is an outer surface with no exposed optical elements on which is coated an adhesive as defined herein.

It may be easier to wrap retroreflective sheeting around the exposed or outside surface of either a cone-shaped or a cylindrical-shaped traffic device when the sheeting is "flexible," "conformable," or "embossable," and thus those types of sheetings may be preferred for use with the present invention. Illustrative examples of such sheeting are disclosed in U.S. Pat. Nos. 5,138,488 (Szczech); 5,387,458 (Pavelka); 5,450,235 (Smith); 5,605,761 (Bums); 5,614,286 (Bacon); 5,066,098 (Kult et al.); and 4,896,943 (Tolliver et al.).

A wide variety of types of retroreflective sheeting has been found to be useful for the present invention. Preferably, the retroreflective sheeting selected shall have a retroreflectivity under wet or rainy conditions not less than 70% of its retroreflectivity under dry conditions. Further description of retroreflection and retroreflective sheeting is found in "Standard Specification for Retroreflective Sheeting for Traffic Control" ASTM D 4956-94 (November 1994).

Forming of retroreflective sheeting is described in Information Folder 1.10 "Cutting, Matching, Premasking, and Prespacing of 3M™ Scotchlite™ Reflective Sheetings and Films" (April 1998) available from Minnesota Mining and Manufacturing Company (3M) of St. Paul, Minn. For example, single sheets can be hand cut, die cut, or cut electronically using a computer controlled machine. Volume cutting can be accomplished by methods such as band sawing, roll cutting, or guillotining. Such methods can be used for forming the retroreflective sheeting into pieces having the desired shape for forming sleeves.

Adhesives

The adhesive article may employ a wide variety of art known adhesives, preferably one that is aggressively tacky and forms strong bonds on contact with substrates such as traffic devices. The adhesive composition is preferably a pressure-sensitive adhesive. Non-pressure-sensitive adhesives, thermally-activatable, chemically-activatable (by solvent, plasticizer, etc.) adhesives, water-activatable adhesives, may also be used if desired.

As a class, pressure sensitive adhesives tend to perform well in the practice of the present invention. Typically, a pressure sensitive adhesive is used in embodiments in which the adhesive forms a layer that is masked by overlying protrusions (e.g., particles, fibers, fibrous mat).

One well known means of identifying pressure sensitive adhesives is the Dahlquist criterion. This criterion defines a pressure sensitive adhesive as an adhesive having a 1 second creep compliance of greater than $1 \times 10^{-6}$ cm$^2$/dyne as described in Handbook of Pressure Sensitive Adhesive Technology, Donatas Satas (Ed.), $2^{nd}$ Edition, p. 172, Van Nostrand Reinhold, New York, N.Y., 1989. Alternatively, since modulus is, to a first approximation, the inverse of creep compliance, pressure sensitive adhesives may be defined as adhesives having a Young's modulus of less than $1 \times 10^6$ dynes/cm$^2$. Another well known means of identifying a pressure sensitive adhesive is that it is aggressively and permanently tacky at room temperature and firmly adheres to a variety of dissimilar surfaces upon mere contact without the need of more than finger or hand pressure, and which may be removed from smooth surfaces without leaving a residue as described in Glossary of Terms Used in the Pressure Sensitive Tape Industry provided by the Pressure Sensitive Tape Council, August, 1985. Another suitable definition of a suitable pressure sensitive adhesive is that it preferably has a room temperature storage modulus within the area defined by the following points as plotted on a graph of modulus versus frequency at 25° C.: a range of moduli from approximately $2 \times 10^5$ to $4 \times 10^5$ dynes/cm$^2$ at a frequency of approximately 0.1 radian/second (0.017 Hz), and a range of moduli from approximately $2 \times 10^6$ to $8 \times 10^6$ dynes/cm$^2$ at a frequency of approximately 100 radians/sec (17 Hz) (for example see FIGS. 8–16 on p. 173 of Handbook of Pressure Sensitive Adhesive Technology (Donatas Satas, Ed.), $2^{nd}$ Edition, Van Nostrand Rheinhold, N.Y., 1989). Any of these methods of identifying a pressure sensitive adhesive may be used to identify suitable pressure sensitive adhesives for use in the methods and articles of the present invention.

Examples of pressure sensitive adhesives useful in the present invention include tackified natural rubbers, tackified synthetic rubbers, tackified styrene block copolymers, (meth)acrylics, poly(alpha-olefins), and tackified silicones.

Useful natural rubber pressure sensitive adhesives generally contain masticated natural rubber, from 25 parts to 300 parts of one or more tackifying resins to 100 parts of natural rubber, and typically from 0.5 part to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade. Tackifying resins used with natural rubbers generally include, but are not limited to, wood rosin and its hydrogenated derivatives, terpene resins of various softening points, and petroleum-based resins. Other materials can be added to natural rubber adhesives for special purposes, wherein the additions can include plasticizers, pigments, and curing agents to partially vulcanize the pressure sensitive adhesive.

Another useful class of pressure sensitive adhesives are those that include synthetic rubber. Such adhesives are generally rubbery elastomers, which are either self-tacky or non-tacky and require tackifiers. Self-tacky synthetic rubber pressure sensitive adhesives include, for example, butyl rubber, a copolymer of isobutylene with less than 3 percent isoprene, polyisobutylene, and a homopolymer of isoprene, polybutadiene, or styrene/butadiene rubber. Synthetic rubber pressure sensitive adhesives, which generally require tackifiers, are also generally easier to melt process. They include polybutadiene or styrene/butadiene rubber, from 10 parts to 200 parts of a tackifier, and generally from 0.5 part to 2.0 parts per 100 parts rubber of an antioxidant. An example of a synthetic rubber is that commercially available from B. F. Goodrich under the trade designation "AMERIEPOL 101 IA," a styrene/butadiene rubber. Tackifiers that are useful include derivatives of rosins, polyterpenes, C5 aliphatic olefin-derived resins, and C9 aromatic/C5 aliphatic olefin-derived resins.

Styrene block copolymer pressure sensitive adhesives generally include elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as those commercially available from Shell Chemical Co. under the trade designations "KRATON D1107," "KRATON G1657," "KRATON G1750," and "KRATON D1118." The polystyrene blocks tend to form domains in the shape of spheroids, cylinders, or lamellae that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as those commercially available under the trade designations "ESCOREZ 1300" from Exxon Chemical Co. and "WINGTACK" from Goodyear; rosin esters, such as those commercially available from Hercules, Inc. under the trade designations "FORAL" and "STAYBELITE Ester 10"; hydrogenated hydrocarbons, such as that commercially available from Exxon Chemical Co. under the trade designation "ESCOREZ 5000"; polyterpenes, such as that commercially available from Hercules, Inc. under the trade designation "PICCOLYTE A"; and terpene phenolic resins derived from petroleum or terpentine sources, such as that commercially available from Hercules, Inc. under the trade designation "PICCOFYN A100." Resins that associate with the thermoplastic phase tend to stiffen the pressure sensitive adhesive.

(Meth)acrylic pressure sensitive adhesives generally have a glass transition temperature of about 0° C. or less and may include from 100 to 80 weight percent of a C4–C12 alkyl ester component such as, for example, isooctyl acrylate, 2-ethyl-hexyl acrylate and n-butyl acrylate and from 0 to 20 weight percent of a polar or cohesively reinforcing component such as, for example, acrylic acid, methacrylic acid, vinyl acetate, N-vinyl pyrrolidone and styrene macromer.

Preferably, the (meth)acrylic pressure sensitive adhesives include from 0 to 20 weight percent of acrylic acid and from 100 to 80 weight percent of isooctyl acrylate. The (meth) acrylic pressure sensitive adhesives may be self-tacky or tackified. Useful tackifiers for (meth)acrylics are rosin esters such as that commercially available from Hercules, Inc. under the trade designation a"FORAL 85," aromatic resins such as that commercially available from Hercules, Inc. under the trade designation "PICCOTEX LC-55WK," and terpene resins such as those commercially available from Arizona Chemical Co. under the trade designations "PIC-COLYTE A-115," "ZONAREZ B-100," and "SILVAREZ 2019." Other materials can be added for special purposes, including pigments, and curing agents.

Poly(alpha-olefin) pressure sensitive adhesives, also called poly(1-alkene) pressure sensitive adhesives, generally include either a substantially uncrosslinked polymer or uncrosslinked polymer that may have radiation activatable functional groups grafted thereon as described in U.S. Pat. No. 5,209,971 (Babu, et al.). The poly(alpha-olefin) polymer may be self tacky and/or include one or more tackifying materials.

Tackifying materials are typically resins that are miscible in the poly(alpha-olefin) polymer. The total amount of tackifying resin in the poly(alpha-olefin) polymer ranges from 0 to 150 parts by weight per 100 parts of the poly (alpha-olefin) polymer depending on the specific application. Useful tackifying resins include resins derived by polymerization of C5 to C9 unsaturated hydrocarbon monomers, polyterpenes, styrene- or phenol-modified polyterpenes, and the like. Examples of such commercially available resins based on a C5 olefin fraction of this type include those available from Goodyear under the trade designation "WINGTACK." Other materials can be added for special purposes, including antioxidants, fillers, pigments, and radiation activatable crosslinking agents.

Silicone pressure sensitive adhesives include two major components, a polymer or gum, and a tackifying resin. The polymer is typically a high molecular weight polydimethylsiloxane or polydimethyldiphenylsiloxane that contains residual silanol fuictionality (SiOH) on the ends of the polymer chain, or a block copolymer including polydiorganosiloxane soft segments and urea terminated hard segments. The tackifying resin is generally a three-dimensional silicate structure that is endcapped with trimethylsiloxy groups ($OSiMe_3$) and also contains some residual silanol finctionality. Examples of tackifying resins include those available from General Electric Co., Silicone Resins Division, Waterford, N.Y., under the trade designation "SR 545" and from Shin-Etsu Silicones of America, Inc., Torrance, Calif. under the trade designation "MQD-32-2." Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir et al.).

In addition to these pressure sensitive adhesives, another preferred adhesive suitable for use in the present invention is one that includes any of the above-listed pressure sensitive adhesive elastomers and a large amount of a tackifiing resin, the latter being included in sufficient amount to lower the pressure sensitive adhesive characteristics of the adhesive to levels needed for convenient and effective room-temperature handling of sheets coated with the adhesive, while leaving the adhesive with the capacity for strong heat- or plasticizer-activatable bonds. Examples of such heat-activatable, over-tackified, adhesives are disclosed in U.S. Pat. No. 4,248,748 (McGrath et al.). Such adhesives can be used as an adhesive layer underlying particles, fibers, or a fibrous web. Alternatively, such adhesives can be used as the particles overlying the same or a different adhesive layer. Other embodiments using these "over-tackified" adhesives can also be envisioned as long as they include an adhesive with a plurality of protrusions that can be "activated" to bond to a substrate using a fluid application aid. Herein, an "over-tackified" adhesive is a latent adhesive that does not have adhesive properties (e.g., is not tacky) due to a relatively large amount of tackifier, but does acquire adhesive properties once it is activated by the application of a plasticizing agent or heat.

In such "over-tackified" adhesives, the tackifying resins are generally well-known resins, which are typically thermoplastic, resinous, room-temperature solids characterized by their ability to increase the glass transition temperature (Tg) and the tackiness of an elastomer. Tackiness can be measured by a variety of tests, such as the "inclined trough" or "rolling ball" test in which a stainless steel ball is allowed to roll down an inclined trough at the bottom of which a tape coated with the mixture being tested is supported. Useful tackifying resins will usually increase the tackiness of conventional pressure sensitive adhesive polymers when added in typical amounts of 20 to 100 parts per 100 parts of adhesive polymer. Over-tackified adhesives will usually result when tackifying resins are added in higher amounts than needed to make a pressure sensitive adhesive.

Naturally occurring materials, which are typically complex mixtures of high-molecular-weight organic acids and related neutral materials, are a common form of tackifying resin. Wood or other rosins, or modified forms of such naturally occurring rosins, e.g., hydrogenated or esterified rosins, are particularly useful. Polymers of terpene, pinene, etc., and low-molecular-weight styrene resins are also useful. Examples of other suitable tackifying resins are listed throughout the description above of the pressure sensitive adhesives. Other suitable over-tackified adhesives are described in Applicants' Assignee's copending applications having U.S. Ser. No. 09/697,005, filed on even date herewith, entitled "Latent, Over-Tackified, Adhesives and Methods of Use", and U.S. Ser. No. 09/697,008, filed on even date herewith, entitled "Imagewise Printing of Adhesives and Limited Coalescence Polymerization Method". These adhesives are able to be activated by application of a plasticizer, for example, as described in greater detail below.

Preferred Plasticizer-Activatable Acrvlate Adhesive

A preferred adhesive useful in the present invention includes the plasticizer-activatable high Tg acrylic polymer based (pressure sensitive) adhesives disclosed in International Publication No. WO 00/56830 (published Sep. 28, 2000). Such adhesives include a base copolymer having a Tg greater than about 10° C., wherein the base copolymer is formed from: about 50% to about 70% by weight of a high Tg comonomer component, wherein the homopolymer formed from the high Tg comonomer component has a Tg of at least about 20° C.; optionally, up to about 20% by weight based on the total weight of the base copolymer of an acidic comonomer; and about 30% to about 50% by weight of one or more low Tg (meth)acrylate comonomer, wherein the Tg of the homopolymer of the low Tg comonomer is less than about 20° C. To activate the base copolymer.(an adhesive precursor or latent adhesive, which is included within the definition of adhesive as used herein) to form a pressure sensitive adhesive, about 1 part to about 100 parts, based on 100 parts of the base copolymer, of a plasticizing agent is added. The plasticizer can be added to the base polymer prior to forming the adhesive article, or it can be added subsequent to forming the adhesive article. The plasticizer can be added to the base copolymer subsequent to the adhesive article being applied to a substrate to which it is to adhere.

One of the advantages of using these preferred plasticizer-activatable pressure sensitive adhesives is the ability to deliver the base copolymer or mixtures of the base copolymer and a solid, powdered plasticizing agent (discussed below) using powder coating techniques. These powders can be formed from well-known polymerization techniques as well as mechanical techniques such as cryo-grinding or hammer milling. All or a portion of the powdered base copolymer coating can then be activated to a material having pressure sensitive adhesive properties by introducing a fluid application aid (e.g., a liquid plasticizing agent) by means of spray, flood, or other liquid delivery techniques (such as ink jet) to the protrusions.

Base Copolymer. The base copolymer of these preferred plasticizer-activatable pressure sensitive adhesives is low in tack or totally tack-free at room temperature (i.e., about 20° C. to about 25° C.). The base copolymer derives its low tack or no tack characteristics at room temperature from its high Tg and/or high shear storage modulus. In general, the high Tg and high modulus base copolymers have significant glassy character and are non-elastomeric in nature. In addition to having a Tg that is at least about 10° C., the low tack or non-tacky base copolymers of these preferred plasticizer-activatable adhesives also possess a shear storage modulus of at least $5 \times 10^5$ Pascals at 23° C. and 1 Hz. To transform the base copolymer to a material that exhibits pressure sensitive adhesive properties, the plasticizing agent should be chosen to lower the base copolymer's Tg to below about 10° C., preferably below 0° C., and its shear storage modulus to below the Dahiquist Criterion. This is also true for the over-tackified adhesives discussed above.

The high Tg comonomers of these preferred plasticizer-activatable adhesives are ethylenically unsaturated monomers, preferably monoethylenically unsaturated monomers having a homopolymer Tg greater than about 20° C., most preferably greater than about 50° C., and can be copolymerized with the low Tg (meth)acrylate monomers described below. Examples of useful high Tg comonomers include, but are not limited to, substituted lower (C1–C4) alkyl methacrylates such as, methyl methacrylate, ethyl methacrylate; vinyl esters such as vinyl acetate, vinyl pivalate; and vinyl neononanoate; N-vinyl lactams such as N-vinyl pyrrolidone; N-vinyl caprolactam; substituted (meth)acrylamides such as, N,N-dimethyl acrylamide, N,N-dimethyl methacrylamide, N,N-diethyl acrylamide, and N,N-diethyl methacrylamide; (meth)acrylonitrile; maleic anhydride; acrylate and methacrylate esters of cycloalkyl; aromatic or bridged cycloalkyl alcohols such as isobornyl acrylate, isobornyl methacrylate, 4-t-butylcyclohexyl methacrylate, cyclohexyl methacrylate, phenyl acrylate, phenylmethacrylate, 2-naphthyl acrylate, and 2-naphthyl methacrylate; styrene and substituted styrene derivatives such as α-methyl styrene; and mixtures thereof. Particularly preferred are ethyl methacrylate, methyl methacrylate, isobornyl acrylate, isobornyl methacrylate, 4-t-butyl cyclohexyl methacrylate, 4-t-butyl cyclohexyl acrylate, cyclohexyl methacrylate, N,N-dimethyl acrylamide, N,N-dimethyl methacrylamide, acrylonitrile, and mixtures thereof.

The base copolymer of these preferred plasticizer-activatable adhesives also contains one or more low Tg (meth)acrylate comonomers. Examples of useful low Tg (meth)acrylate comonomers include monofunctional unsaturated monomers selected from the group of (meth)acrylate esters of non-tertiary alkyl alcohols, the alkyl groups of which include from about 1 to about 18, preferably about 4 to about 12 carbon atoms, and mixtures thereof. Preferred (meth)acrylate monomers, when homopolymerized, have a Tg below 20° C., preferably below 0° C. and have the following general Formula (I):

Formula (I)

wherein $R^1$ is H or $CH_3$, the latter corresponding to where the (meth)acrylate monomer is a methacrylate monomer. $R^2$ is broadly selected from linear or branched hydrocarbon groups and may contain one or more heteroatoms. The number of carbon atoms in the hydrocarbon group is preferably about 1 to about 18, and more preferably about 4 to about 12.

Examples of suitable (meth)acrylate monomers useful in the present invention include, but are not limited to, methylacrylate, ethylacrylate, n-butyl acrylate, decyl acrylate, 2-ethylhexyl acrylate, hexyl acrylate, isoamyl acrylate, isodecyl acrylate, isononyl acrylate, isooctyl acrylate, lauryl acrylate, 2-methyl butyl acrylate, 4-methyl-2-pentyl acrylate, ethoxyethoxyethyl acrylate and mixtures thereof. Particularly preferred are 2-ethylhexyl acrylate, isooctyl acrylate, lauryl acrylate, ethoxyethoxyethyl acrylate, and mixtures thereof.

Instead of, or in addition to, lower Tg acrylates and methacrylates, lower Tg vinyl esters such as vinyl-2-ethylhexanoate, vinyl neodecanoate, and the like can also be used.

Similar to the high Tg comonomers used in the base copolymer, the optional acidic comonomers also contribute to the mechanical properties of the plasticized pressure sensitive adhesive composition. In addition, such acidic comonomers enhance internal reinforcement and surface affinity of the resultant plasticized pressure sensitive adhesive composition. Useful acidic comonomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, β-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability and effectiveness in reinforcing (meth)acrylate pressure sensitive adhesives, particularly preferred acidic monomers are the ethylenically unsaturated carboxylic acids, most preferably acrylic acid, β-carboxyethyl acrylate, and methacrylic acid.

The base copolymer of the plasticizer-activatable adhesive preferably includes, based upon 100 parts by weight total, about 30 to about 70 parts by weight of a high Tg comonomer, about 30 to about 50 parts by weight of a low Tg (meth)acrylate comonomer, and optionally up to about 20 parts by weight of an acidic comonomer. More preferably, the base copolymer includes about 40 to about 65 parts by weight of a high Tg comonomer, about 35 to about 50 parts by weight of a low Tg (meth)acrylate comonomer, and about 2 to about 15 parts by weight of an acidic comonomer.

Additives. A free radical initiator is preferably added to aid in the copolymerization of the high Tg comonomers, low Tg (meth)acrylate comonomers, and optional acidic comonomers. Optionally, the composition also includes a chain transfer agent to control the molecular weight of the base copolymer. A crosslinking agent can also optionally be included to improve the internal strength, solvent resistance, and other properties of the adhesive compositions. Other additives can be included in the polymerizable mixture or added at the time of compounding or coating to change the properties of the base copolymer. Such additives, include pigments, tackifiers, fillers, such as glass or polymeric bubbles or beads (which may be expanded or unexpanded), hydrophobic or hydrophilic silica, calcium carbonate, glass or synthetic fibers, blowing agents, toughening agents, reinforcing agents, fire retardants, antioxidants, and stabilizers. Examples of such additives are described in International Publication WO 00/56830 (published Sep. 28, 2000).

Polymerization Methods. In the practice of the invention, the base copolymers can be polymerized by techniques including, but not limited to, the conventional techniques of solvent polymerization, dispersion polymerization, emulsion polymerization, suspension polymerization, solventless bulk polymerization, and radiation polymerization, including processes using ultraviolet light, electron beam, and gamma radiation. The starting materials may comprise a polymerization initiator, especially a thermal initiator or a photoinitiator of a type and in an amount effective to polymerize the comonomers of the base copolymer. These methods are disclosed in International Publication WO 00/56830 (published Sep. 28, 2000).

Plasticizer

Suitable plasticizing agents can be added to the base copolymer of the preferred plasticizer-activatable acrylate adhesives described above prior to and/or after application to a surface to form an adhesive article and/or after application of the adhesive article to a substrate. If added to the base copolymer prior to application to a surface to form an adhesive article, the plasticizing agent is typically used in amounts of from about 1 part to about 100 parts by weight per 100 parts of the base copolymer. Preferably, the plasticizing agent is present in amounts from about 3 parts per hundred (pph) to about 50 pph. Most preferably, the plasticizing agent is present in amounts from about 3 pph to about 40 pph.

Plasticizing agents selected for use in the polymerizable compositions possess a range of properties. Generally, the plasticizing agents can be liquid or solid, have a range of molecular weights and architectures, are compatible with the base copolymers. They can be monomeric or polymeric, volatile or non-volatile, and reactive or non-reactive. Additionally, mixtures of plasticizing agents can be used in the present invention.

Generally, liquid plasticizing agents are readily compoundable with the base copolymers and/or can be chosen to be miscible with comonomers for plasticized pressure sensitive adhesive compositions prepared using bulk polymerization methods. Although somewhat more challenging to use, solid plasticizing agents can advantageously be used in applications, processes or articles where the controlled plasticization of the base copolymer is desired. For example, hot melt processible pressure sensitive adhesive compositions can be easily transported and handled prior to melt compounding if both the base copolymer and plasticizing agent components are solid and non-tacky. Once heated to the melting or glass transition temperature of the solid plasticizing agent, the base copolymer is plasticized and the mixture exhibits pressure sensitive adhesive properties.

Additionally, the plasticizing agents can have a range of molecular weights and architectures. That is, the plasticizing agents can be either polymeric or monomeric in nature. Typically, monomeric plasticizing agents are derived from low molecular weight acids or alcohols, which are then esterified with respectively a monofunctional alcohol or monofuictional acid. Useful polymeric plasticizing agents are typically derived from cationically or free-radically polymerizable, condensation polymerizable, or ring-opening polymerizable monomers to make low molecular weight polymers.

Useful plasticizing agents are compatible with the base copolymer, such that once the plasticizing agent is mixed with the base copolymer, the plasticizing agent does not phase separate from the base copolymer. By "phase separation" or "phase separate," it is meant that by differential scanning calorimetry (DSC) no detectable thermal transition, such as a melting or glass transition temperature can be found for the pure plasticizing agent in the plasticized pressure sensitive adhesive composition. Some migration of the plasticizing agent from or throughout the plasticized adhesive can be tolerated, such as minor separation due to composition equilibrium or temperature influences, but the plasticizing agent does not migrate to the extent that phase separation occurs between the base copolymer and the plasticizing agent. When polymeric plasticizing agents are used, they tend to be a bit more limited in their applications than monomeric plasticizing agents and, in general, the lower the molecular weight of a given type of polymeric plasticizing agent, the higher their compatibility with the base copolymer. Plasticizing agent compatibility with the base copolymer can also be dependent upon the chemical nature of the plasticizing agent and the monomeric content of the base copolymer. For example, polymeric plasticizing agents based on polyether backbones (such as polyethylene glycols) are observed to be more compatible than polyester plasticizing agents, especially when higher levels of acidic comonomer are used.

Suitable plasticizing agents are preferably non-volatile such that they remain present and stable in the plasticized adhesive. The presence of the plasticizing agent in the plasticized pressure sensitive adhesive compositions operates to maintain adhesion properties of the adhesive compositions.

Additionally, useful plasticizing agents can be reactive or non-reactive. Preferably, they are non-reactive. Plasticizing agents having acrylate functionality, methacrylate functionality, styrene functionality, or other ethylenically unsaturated, free radically reactive fumctional groups will generally be reactive with the base copolymer. Such plasticizers include acrylated polyesters and acrylated urethanes.

Examples of preferred plasticizing agents include polyalkylene oxides having weight average molecular weights of about 150 to about 5,000, preferably of about 150 to about 1,500, such as polyethylene oxides, polypropylene oxides, polyethylene glycols; alkyl or aryl functionalized polyalkylene oxides, such as that commercially available from ICI Chemicals under the trade designation "PYCAL 94" (a phenyl ether of polyethylene oxide); benzoyl functionalized polyethers, such as that commercially available from Velsicol Chemicals under the trade designation "BENZOFLEX 400" (polypropylene glycol dibenzoate); monomethyl ethers of polyethylene oxides; monomeric adipates such as dioctyl adipate, dibutyl adipate, dibutoxyethoxyethyl adipate, and dibutoxypropoxypropyl adipate; polymeric adipates such as polyester adipates; citrates such as acetyltri-n-butyl citrate; phthalates such as butyl benzylphthalates, dibutyl phthalate, diisoctyl phthalate; trimellitates; sebacates such as dibutylsebacate; myristates such as isopropyl myristate; polyesters such as those commercially available from C. P. Hall Co. under the trade designation "PARAPLEX"; phosphate esters such as those commercially available from Monsanto under the trade designation "SANTICIZER" (e.g., 2-ethylhexyl iphenylphosphate and t-butylphenyl diphenylphosphate); glutarates such as that commercially available form C. P. Hall Co. under the trade designation "PLASTHALL 7050" (a dialkyl diether glutarate); oils such as mineral oil; other polymeric plasticizing agents such as polyurethanes, polyureas, polyvinylethers, polyethers, polyacrylates; and mixtures thereof.

Coating Methods

A wide variety of conventional coating techniques can be used to apply the adhesive compositions to surfaces, whether the compositions are in solution form, emulsion form, melt form, or the like, or require radiation polymerization including processes using ultraviolet light, electron beam, and gamma radiation. These methods are well known to those skilled in the art. Useful coating techniques from solution include brush, roll, spray, spread, wire, gravure, transfer roll, air knife, curtain, or doctor blade coating. The adhesive compositions may be used to make a coatable thermoplastic hot melt adhesive using known techniques. Conventional methods of applying a hot melt coating can be used. Other techniques for coating other forms of the adhesive composition are well known to those skilled in the art. Certain of these art described in Applicants' Assignee's copending application U.S. Ser. No. 09/697,005, filed on even date herewith, entitled "Latent, Over-Tackified, Adhesives and Methods of Use".

Protrusions

The adhesive article includes a surface on which is disposed an adhesive with a plurality of protrusions, preferably nontacky protrusions at the temperature of application of the adhesive article to the substrate during positioning. The protrusions can be in the form of particles, fibers, or a fibrous web disposed on the adhesive surface. Alternatively, the adhesive can have a topologically structured adhesive surface such that structured features are a part of the adhesive layer. Thus, as used herein, the phrase "a plurality of protrusions on the adhesive surface" includes particles, fibers, or fibrous webs (woven or nonwoven) that are applied to the surface of the adhesive as well as structured features that are part of the adhesive surface. The protrusions can be used to mask or temporarily deactivate the adhesive (although this is not a requirement) to prevent permanent adherence of the adhesive article to a substrate, but they do not deleteriously affect the bond strength between the adhesive and the substrate to which it is intended to be applied.

The protrusions can be of the same material as the adhesive or of a different adhesive material. For example, particles of the appropriate size can be made using various methods as described in Applicants' Assignee's copending application U. S. Ser. No. 09/697,008, filed on even date herewith, entitled "Imagewise Printing of Adhesives and Limited Coalescence Polymerization Method".

Alternatively, the protrusions can be made of a nontacky (nonadhesive) organic or inorganic material, or a mixture thereof. Suitable particulate material includes particles that are not soluble in the adhesive. Examples of suitable organic polymeric particles include, but are not limited to, polypropylene homopolymers, propylene-ethylene copolymer, propylene-butene copolymers, propylene-hexene copolymers, propylene-butene-ethylene terpolymers, polyethylene based adhesives, ethylene/vinyl acetate (EVA) resins, polystyrene, polyethylene, PTFE polymers, polyvinyl chloride (PVC), low molecular weight polyethylene waxes, starch particles such as that derived from corn, wheat, or other grains, cellulose particles, tackifiers, nontacky adhesive precursor particles, sugar particles, etc. Examples of suitable inorganic particles include talcs, silica particles, glass beads, alumina particles, ground calcium carbonate, zeolites, calcium chloride, sodium chloride, potassium chloride, alum, and combinations thereof. Preferably, the protrusions are made of a material that is chosen to be substantially insoluble in the fluid application aid.

The protrusions can be of various shapes, whether regular or irregular, and sizes. They can be spherical, hemispherical, platelet, cubic, columnar, etc. They can be hollow or solid. They can be elastic or inelastic. They can be adhesive or nonadhesive. If adhesive, they can be tacky or nontacky at the temperature at which the adhesive article is applied to the substrate and positioned in place. Preferably, the protrusions are nontacky. Also, preferably, the protrusions are not provided by the structure of the backing on which they are disposed telescoping through the adhesive layer.

If the protrusions in the adhesive article are provided by fibers, they may be in the form of blown fibers. Such blown fibers can be directly blown onto an adhesive surface of the adhesive article or they can be blown into the form of a web or mat that could be laminated to an adhesive surface of the adhesive article. If the protrusions are provided by a fibrous web or mat, there is sufficient open space (i.e., voids) such that the underlying adhesive can contact the substrate. For example, it is believed that the openness (i.e., area of open space in a two-dimensional projection of the web or mat) should be at least about 25%, and preferably, at least about 50% for effective results.

Preferably, the particles have an average protrusion exposure (i.e., the distance the protrusion extends above the surface of the intervening or underlying adhesive) of no greater than about 200 micrometers (i.e., microns), more preferably, no greater than about 100 microns, and most preferably, no greater than about 50 micron. A particularly preferred average protrusion exposure is about 5 microns to about 30 microns. Preferably, the average protrusion exposure is at least about 15 microns. If the protrusions are provided by discreet particles, the average protrusion exposure is typically an average particle size, which is the length of the largest dimension of the particle. If the protrusions are provided by fibers in a web, the individual fibers may be of significant length, but the average distance the protrusions of the web extend above the surface of the underlying adhesive is no greater than about 200 microns.

The particles are typically applied to the adhesive as solid particles using conventional powder coating techniques. Alternatively, the particles can be applied in a liquid state. For example, if the particles are in the molten state, they can be applied using a rotary screen coating process or spraying the liquid to form discrete dots, for example.

If the protrusions result from topologically structured features in the adhesive surface, they can be of various shapes and sizes. They can be shaped such that the cross section of a protrusion taken in a plane parallel to the adhesive layer may be oval, circular, polygonal, rectangular, star-shaped, annular, irregular, and any combination thereof. They can have flat tops if desired. Preferably, the average height of an array of structured features over the adhesive surface is at least about 15 microns. They preferably have an average height of no greater than about 200 microns, more preferably, no greater than about 100 microns, and most preferably, no greater than bout 50 microns. The structured features can be made by a variety of well known techniques, including embossing and casting.

The particle size of the particles or height of the structured features (generically referred to herein as "protrusion size") may vary, but the particle size or feature height variation is preferably random, that is, it is undesirable to have a number of smaller protrusions grouped together. Preferably, protrusion size is uniform; however, it is within the scope of the present invention to have a plurality of protrusions having varying protrusion sizes.

The number of protrusions on the adhesive surface is preferably sufficient to allow the adhesive article to be positionable. They are also preferably substantially uniformly distributed on the functional portion of the adhesive surface. Preferably, this means that the protrusions are present in an amount that inhibits the adhesive from adhering to the substrate while placing the article in the desired position on a substrate. Typically, the protrusions cover about 10% to about 95% of the surface area of the adhesive, and preferably, about 30% to about 70% of the surface area.

Substrates

The adhesive articles of the present invention can be adhered to a wide ariety of substrates using the methods of the present invention. The substrates an include, for example, metal, asphalt, concrete, ceramic, wood, masonry, lass, polymeric materials, gypsum wall board, and painted surfaces. The ubstrates can be rough or smooth, porous or nonporous.

Examples of metal surfaces include aluminum, steel, copper, and brass, but are not limited in scope to only these examples. The metal may be in sheet form such as the surface of a traffic sign, or it may be cylindrical such as in the shape of a pipe or pole, or it may be corrugated such as in a highway guard rail. Other shapes are also within the scope of this invention. The asphalt can be in the form of a roadway, bicycle path, or a pedestrian walkway surface. Concrete surfaces may include concrete blocks, roadways, curbs, sidewalks, parking lots, bridge abutments, and a large number of other concrete surfaces to which adhesion enhancement is desired. Ceramic surfaces include, for example, tile, porcelain, and stone. Wood surfaces include, for example, wood panels, particle board, wooden barricades, wooden walkways, or wooden parts of vehicles. Masonry includes, for example, brick and cinder block. Glass windows are another example of substrates for which this invention is important. Painted surfaces can include, for example, the painted sides of vehicles such as trucks or railway cars, painted markings on a roadway, painted sign surfaces, painted walls, or painted traffic barricades or barriers.

Polymeric substrates useful in this invention may be in sheet form or may take any other shape. Examples of polymeric materials include, but are not limited to, polyethylenes, polypropylenes, polyesters, polyarnides, polycarbonates, polyvinyl chlorides, polymethyl methacrylates, polyacrylates, polyimides, and natural and synthetic rubbers. The polymeric material may also be biological in origin and may include cellulose and its natural or synthetic derivatives. These polymeric materials may be in the form of traffic drums or cones, polymeric barricades, polymeric signage, etc.

Preferably, the substrate includes a plasticized polyvinyl chloride, although other polymers that include plasticizers, such as vinyl films, which can contain as much as 100 parts monomeric plasticizer (e.g., dioctylphthalate) to 100 parts vinyl resin, are suitable substrates.

A preferred substrate to which an adhesive article of the present invention is adhered is a traffic device, such as a traffic cone. As is shown in FIG. 4, traffic device 46 includes base 42 and upright member 46, shown generally frusto conical in shape, although the present invention may also be employed with traffic device 66, as shown in FIG. 6, having base 62 and a generally cylindrical upright member 68. Preferably, traffic cones are constructed of a monolithic molded polymeric material including, but not limited to, plasticized polyvinyl chloride or polyolefins such as polyethylene. The following are examples of conmmercially available traffic cones which may be used with the present invention: Model 28 PVCS available from Work Area Protection Corp. of St. Charles, Ill.; Model TC-28FL available from Service and Materials Co. of Elwood, Ind.; Model 2850-7 available from Lakeside Plastics Inc. of Oshkosh, Wis.

Fluid Application Aids and Methods of Activating Adhesives

The methods of adhering adhesive articles as described herein to a substrate include the use of a fluid application aid. Conventionally, such application aids have been used to eliminate preadhesion. In the methods of the present invention, this can also occur; however, the fluid application aid is primarily used to activate the adhesive article to adhere the article to the substrate. This can be accomplished, for example, by removing nontacky protrusions, masking the function of the nontacky protrusions, or by converting a nontacky protrustions to a tacky adhesive.

The fluid application aid can be applied from an external source or it can migrate out of the substrate, for example, to contact the protrusions. For example, water, preferably with a detergent, can be applied from an external source to wash away the particles. Alternatively, a plasticizer can be applied from an external source, or a plasticizer from the substrate, such as a plasticized polyvinyl chloride substrate, can migrate out of the substrate to activate the plasticizer-activatable protrusions and/or the plasticizer-activatable adhesive itself between and/or underlying the protrusions.

Suitable fluid application aids include water, preferably with a surfactant such as a detergent. A wide variety of surfactants can be used, whether they are ionic or nonionic. Examples of suitable detergents include a wide variety of commercially available detergents such as dishwashing and laundry detergents, household cleaners, hand soaps, and the like.

If a surfactant is used in a fluid application aid, it is preferably present in an amount of at least about 0.01 percent by weight (wt %), more preferably, at least about 0.1 wt %, and most preferably at least about 1 wt %. Typically, it is present in water in an amount of no greater than about 5 wt %.

Alternatively, the fluid application aid can include an organic solvent, such as isopropyl alcohol, ethanol, methanol, glycols, and the like. These can optionally include a surfactant.

Suitable plasticizers that could be used to activate the adhesive and/or the protrusions thereon include, for example, those listed above in the context of the preferred plasticizer-activatable acrylate adhesive. Suitable ones are the liquid plasticizers, although solid plasticizers can be used if they are liquified, for example, by the application of heat, to provide suitable activation of the plasticizer-activatable adhesive. Other plasticizers are disclosed in International Publication No. WO 96/26221 (published Aug. 29, 1996).

The adhesive and/or the protrusions can be activated by a fluid application aid. The fluid application aid can be applied by spraying, dipping, brushing, or otherwise coating. It can be applied as a liquid, solid, or a gel, as long as at the time of activation the solid and gel application aids are liquified sufficiently to flow into the adhesive. Alternatively, the fluid application aid can simply migrate out of the substrate and into the adhesive to convert a nontacky adhesive to a tacky adhesive. In such applications, this typically takes about 2 hours to about 24 hours. The time can be reduced if heat is used. Alternatively, shorter times can result depending on the choice of application aid.

It is envisioned that a wide variety of application methods can be used, and the invention is not so limited. For example, in addition to the methods described above, a liquid plasticizer can be sprayed or brushed onto a cone surface, or the cone dipped in a liquid plasticizer, and then a collar added and adjusted before the plasticizer activates the adhesive. Although, the plasticizers typically bead up on the cone (i.e., they don't wet the surface), adjusting the collar on the cone spreads out the plasticizer thereby making it effective.

EXAMPLES

Objects and advantages of this invention are further illustrated by the following examples, but the particular materials and amounts thereof recited in these examples, as well as other conditions and details, should not be construed to unduly limit this invention. All parts, percentages, and ratios herein are by weight unless otherwise specified.

Sheeting Used in the Examples

"Sheeting A"—retroreflective sheeting commercially available from 3M under the trade designation "3M Scotchlite High Intensity Cone Sheeting Series 3840."

"Sheeting B"—retroreflective sheeting commercially available from 3M under the trade designation "3M Scotchlite High Intensity Flexible Work Zone Sheeting Series 3810."

"Sheeting B2"—retroreflective sheeting commercially available from 3M under the trade designation "3M Scotchlite High Intensity Cone Collars Series 3830."

"Sheeting C"—retroreflective sheeting commercially available from 3M under the trade designation "3M Scotchlite High Intensity Grade Reflective Sheeting Series 2870."

"Sheeting D"—retroreflective sheeting commercially available as "3924F" from 3M under the trade designation "3M Scotchlite Diamond Grade Fluorescent Work Zone Sheeting Series 3920."

Adhesives Used in the Examples

"Adhesive A," "Adhesive B," and "Adhesive C"

Adhesive A, Adhesive B, and Adhesive C were independently prepared in a one liter round bottom flask equipped with a stirrer, a condenser, and an addition fumnel. To each flask was charged 200 grams (g) of a mixture of the monomers in the amounts listed in TABLE I and 0.20 g of 4-acryloxy-benzophenone ("ABP") photocrosslinker (the reaction product of acryloylchloride and 4-hydroxybenzophenone), 0.5 g carbon tetrabromide chain-transfer agent, and 280 g of ethyl acetate. All the ingredients above, including those listed in TABLE I, are commercially available from Aldrich Chemical Co. ("Aldrich"), Milwaukee, Wis.

TABLE I

| | Monomer Ingredients (Grams) | | | |
|---|---|---|---|---|
| Adhesive | Ethylacrylate ("EA") | Butylacrylate ("BA") | N,N-Dimethylacrylamide ("NNDMA") | Acrylic Acid ("AA") |
| A | 104 | 52 | 40 | 4 |
| B | 114 | 52 | 30 | 4 |
| C | 104 | 62 | 30 | 4 |

Each reaction apparatus was inerted with nitrogen and the flask contents heated to 55° C., at which time, a solution of 0.60 g of 2,2'-azobis(isobutyronitrile), an initiator commercially available from DuPont, Willmington, Del. under the trade designation "Vazo 64", in 20 g of ethyl acetate was added at one time via the addition funnel to the mixture. After addition of the initiator solution, each mixture was maintained at 55° C. for about 20 hours. Each adhesive was allowed to cool to room temperature prior to coating.

"Adhesive D"—the adhesive of retroreflective sheeting commercially available from 3M under the trade designation "3M Schotchlite Diamond Grade Fluorescent Flexible Drum Sheeting Series 3910."

"Adhesive E"—the adhesive of retroreflective sheeting commercially available as "3924F" from 3M under the trade designation "3M Scotchlite Diamond Grade Fluorescent Work Zone Sheeting Series 3920."

"Adhesive F"—the adhesive prepared as described for Adhesives A–C, except that the monomer charge was 144 g EA, 52 g BA, 4 g AA and 0.4 g ABP, and the chain-transfer agent was 0.2 g isooctyl thioglycolate commercially available from Hampshire Chemical, Lexington, Mass. instead of 0.5 g carbon tetrabromide.

Particles Used on Adhesives in the Examples
"Talc-S"—talc commercially available from
Suzorite Mineral Products, Inc., Benwood, W.Va.
under the trade designation "PCT 22-17."

"Talc-F"—talc commercially available from Fisher Scientific, Springfield, N.J. under the trade designation "Talc Powder T4 Laboratory Grade."

"Silica-C"—finned silica commercially available from Cabot Corp., Cabo-Sil Div., Tuscola, EL under the trade designation "Cabosil TS 610."

"Silica-D"—flumed silica commercially available from Degussa-Huls Corp., Ridgefield Park, N.J. under the trade designation "Silica 972."

"Silica-F"—silica commercially available from Fuji Silysia Chemical, Ltd., Kasugai-shu, Aichi, Japan under the trade designation "Sylysia 350."

"Corn Starch"—corn starch commercially available from Johnson & Johnson, Skillman, N.J. under the trade designation "Johnson's Baby Powder Pure Cornstarch with Aloe Vera & Vitamin E."

"Adhesive Precursor"

A composition was prepared by mixing 240 parts of a mixture of 35% 2-ethylhexylacrylate (Aldrich), 55% methylmethacrylate (Aldrich) and 10% methacrylic acid (Aldrich); 6.9 parts colloidal silica commercially available from Aldrich under the trade designation "LUDOX TM-50"; 360 parts deionized water; 0.080 parts potassium dichromate (Aldrich); 0.42 part Promoter made according to Column 10, line 4 of U.S. Pat. No. 5,238,736; and 0.3 parts isooctyl thioglycolate. The pH of the mixture was adjusted to between 4 and 5 by the addition of ammonium hydroxide solution and the resultant solution stirred at 22,000 rpm in a Warring blender for 6 minutes. The mixture was placed in a reactor equipped with a mechanical stirrer, a condenser, and a nitrogen inlet and 0.36 part of Vazo 64 was added. The temperature was then raised to 70° C. while stirring at 300 rpm for 4 hours. The resultant suspension was then allowed to cool to room temperature and filtered through cheese cloth, washed with water to remove the potassium dichromate and allowed to air dry. The mean particle size was determined on a Coulter LS Particle Analyzer (from Coulter Corporation, Miami, Fla.) to be about 15 microns. The powder was sifted through a 170-mesh sieve to remove any agglomerates.

"Adhesive Precursor 2"

An aqueous slurry of a composition prepared as described for Adhesive Precursor, except using the following monomer percentages: 85% BA, 13% NNDMA, 2% AA, and 0.1% 1,6-hexanediol diacrylate. After completion of the reaction, the particles were left in the aqueous phase for coating as a dispersion.

Application Aids Used in the Examples

"Dawn/H2O"—3 drops of detergent commercially available from Procter & Gamble, Cincinnati, Ohio under the trade designation "Ultra Dawn Original Scent Concentrated Dishwashing Detergent" in 237 ml (8 oz.) of water.

"IPA"—isopropyl alcohol commercially available from Worum Chemical Company, St. Paul, Minn. under Product #200006.

"Citrus Cleaner"—cleaner commercially available from 3M under the trade designation "3M Citrus Base Cleaner."

"Desk Cleaner"—cleaner commercially available from 3M under the trade designation "3M Desk and Office Cleaner."

"SANTICIZER"—plasticizer commercially available from Solutia, St. Louis, Mo. under the trade designation "SANTICIZER 141."

Comparative Examples A–C

Adhesive-Coated Sheetings Applied To Plasticized PVC

Adhesive A, Adhesive B, and Adhesive C were independently knife coated onto a silicone coated, paper release liner, dried for 10 minutes at room temperature, 10 minutes at 68° C. (155° F.), and then 10 minutes at 121° C. (250° F.). The average thickness of the dried adhesive was 66 micrometers (2.6 mils) for Adhesive A, 71 micrometers (2.8 mils) for Adhesive B and 85 micrometers (3.35 mils) for Adhesive C. The tackiness, as determined by touching each of the dried adhesives, increased from Adhesive A to Adhesive C.

The dried samples of Adhesive A, Adhesive B, and Adhesive C were independently laminated at room temperature using a 5 cm (2 inch) wide hand roller to the non-retroreflective surface of Sheeting B2 to form the sheeting constructions of Comparative Examples A, B, and C, respectively.

After lamination, each of Adhesive A, Adhesive B, and Adhesive C on Sheeting B2 was heated for 5 minutes at 66° C. (150° F.), at which time each adhesive cleanly released from its liner.

Samples, 5 cm square, of the sheeting constructions of Comparative Examples A–C were independently applied to pieces of plasticized PVC, each about 7 cm square, cut from a 71 cm in height standard wide body traffic cone commercially available from Work Area Protection, Lake Charles, Ill. The sheeting construction samples were applied to the cone pieces at both 93° C. (200° F.) and room temperature. Each sheeting construction was adhered to the plasticized PVC at both temperatures, with a strong adhesive bond forming more quickly at 93° C. (200° F.) than at room temperature.

Samples of each of the sheeting constructions of Comparative Examples A–C were folded on themselves, adhesive to adhesive to ascertain whether cone collars of the sheeting constructions could be folded upon themselves without a release liner to protect the adhesive. The samples were then heated in a 66° C. (150° F.) oven for 5 minutes to simulate conditions in storage and shipment. The samples were removed from the oven and immediately evaluated for adhesion by attempting to pull the adhered sheeting apart by hand. The adhesives of the sheeting constructions of Comparative Examples A–C could not be separated at the adhesive-adhesive interface.

Samples of each of the sheeting constructions of Comparative Examples A–C were placed with the exposed adhesive on top of the retroreflective surface of Sheeting B2, rolled down with a 5 cm wide rubber roller, and placed in a 66° C. (150° F.) oven for 5 minutes. Each adhesive bonded well to Sheeting B2, demonstrating that the retroreflective surface of Sheeting B2 did not provide a release surface for these adhesives.

Examples 1–5

Adhesives Masked with Particulate

The release liner of Comparative Example B was removed and Example 1 was prepared by dusting with a paintbrush the exposed adhesive with Silica-C. Excess particles of silica were removed with a damp paper towel.

Example 2 was prepared in the same manner as Example 1, except that Silica-F was used instead of Silica-C.

Example 3 was prepared in the same manner as Examples 1, except that Talc-S was used instead of Silica-C.

Example 4 was prepared in the same manner as Example 3, except that the sheeting construction of Comparative Example A was used.

Example 5 was prepared in the same manner as Example 3, except that the sheeting construction of Comparative Example C was used.

Samples of Examples 1–3 were placed adhesive side to adhesive side and adhesive side to the retroreflective surface of Sheeting B2 as described in Comparative Examples A–C. The samples were placed in a 66° C. (150° F.) oven for 5 minutes, removed from the oven, and immediately evaluated for adhesion by attempting to pull the adhered sheeting apart by hand.

Example 3, using Talc-S on the adhesive, was the most effective in both preventing the adhesives from adhering to one another and in preventing the adhesive from adhering to the retroreflective surface of the Sheeting B2. Example 1, using Silica-C on the adhesive, was the next most effective; the constructions were bonded together but could be easily pulled apart. The third most effective was Example 2, using the Silica-F; the constructions were more strongly bonded than observed with Example 1, but could also be pulled apart with little difficulty.

Samples of the sheeting constructions of Comparative Examples A–C and Examples 3–5 were independently applied to pieces of plasticized PVC as described in Comparative Examples A–C. Each sample was applied to plasticized PVC at room temperature ("RT") and to plasticized PVC that had been heated in a 93° C. (200° F.) oven for about 10 minutes, removed from the oven, and the sample applied immediately to the plasticized PVC. At 0, 5, 15, and 60 minute intervals after application of each sample to the plasticized PVC, adhesion was evaluated by attempting to remove, by hand, the sheeting construction from the plasticized PVC. Adhesion was rated on a scale of 1 to 5 with 1 indicating no adhesion and 5 indicating that the sheeting could not be removed from the plasticized PVC without destroying the sheeting.

The adhesion ratings are set out below in TABLE II. The results show that at room temperature Comparative Examples A–C, the samples with no talc on the adhesive, had modest adhesion immediately after application and, at least with Comparative Examples 2 and 3, show a slow increase in adhesion over the time period indicated. At 93° C. (200° F.), Comparative Examples A–C had a good bond immediately after application, and after 15 minutes, it was very difficult to remove the sheeting from the plasticized PVC. When samples of Examples 4, 3, and 5, the talc coated samples of Comparative Examples A, B, and C, respectively, were applied at room temperature, no adhesion was observed even after 60 minutes. At 93° C. (200° F.), no adhesion was observed at 0, 5 and 15 minutes, but a moderate level of adhesion was observed at 60 minutes following application.

TABLE II

Adhesion Rating With Time

| | Comp. Ex. A | Comp. Ex. B | Comp. Ex. C | Ex. 4 | Ex. 3 | Ex. 5 |
|---|---|---|---|---|---|---|
| RT (Minutes) | | | | | | |
| 0 | 2 | 2 | 2 | 1 | 1 | 1 |
| 5 | 2 | 2 | 2 | 1 | 1 | 1 |
| 15 | 2 | 2.5 | 2.5 | 1 | 1 | 1 |
| 60 | 2 | 3 | 3 | 1 | 1 | 1 |
| 93° C. (Minutes) | | | | | | |
| 0 | 4 | 4 | 4 | 1 | 1 | 1 |
| 5 | 4.5 | 4.5 | 4.5 | 1 | 1 | 1 |
| 15 | 5 | 5 | 5 | 1 | 1 | 1 |
| 60 | 5 | 5 | 5 | 3 | 3 | 3 |

Comparative Examples D–F

Crosslinking Adhesive to Control Tack

The adhesives of Comparative Examples A–C were independently crosslinked by exposure to ultraviolet ("UV") light to generate Comparative Examples D–F, respectively.

Samples of Comparative Examples A–C were irradiated with a single 118 watt/cm (300 watt/inch) medium pressure mercury vapor lamp with 7.9 alternating current amps for the number of passes and at the speed set out in TABLE III, resulting in the dose indicated in TABLE III. Tackiness, as determined by touching each of the adhesives after irradiation, are set out as "Observation of Tack" in TABLE III.

The adhesives of Comparative Examples D-1H, E-1H and F-1H were adhesively bonded to Sheeting B2, but were slightly less tacky than the samples of Comparative Examples A–C (without UV curing).

The data in TABLE III show that crosslinking of the adhesive did not sufficiently inactivate the adhesive to enable traffic cones to be shipped, stored and used without a liner protecting the adhesive.

TABLE III

| Comparative Ex. No. | Passes (Number; Speed) | Dose | Observation of Tack |
|---|---|---|---|
| D-1; E-1; F-1 | 1; 11.3 meters/minute (m/min) | 0.297 J/cm$^2$ | No noticeable change |
| D-2; E-2; F-2 | 2; 11.3 m/min | 0.297 J/cm$^2$ | No noticeable change |
| D-3; E-3; F-3 | 3; 11.3 m/min | 0.297 J/cm$^2$ | No noticeable change |
| D-4; E-4; F-4 | 4; 8.4 m/min | 0.432 J/cm$^2$ | No noticeable change |
| D-5; E-5; F-5 | 5; 8.4 m/min | 0.432 J/cm$^2$ | Slightly less tacky |
| D-1H; E-1H; F-1H | 1; 3 m/min | 1.617 J/cm$^2$ | Moderately less tacky |

Comparative Examples D-4, E-4 and F-4 were independently applied to Sheeting B2 as described in Comparative Examples A–C and heated in a 66° C. (150° F.) oven for 5 minutes. The samples were adhesively bonded, but were slightly less tacky than the samples of Comparative Examples A–C (without UV curing).

Comparative Examples E-1, F-1, E-5 and F-5 were independently applied to room temperature ("RT") and to 93° C. (200° F.) plasticized PVC as described in Comparative Examples A–C. The sheeting constructions were pressed against plasticized PVC pieces using weights to aid in providing good contact between the sample and the plasticized PVC. The sheeting constructions applied to the plasticized PVC at 93° C. (200° F.) were maintained at that temperature for 15 minutes. Adhesion of the sheeting constructions to the plasticized PVC was rated on a scale of 1 to 5 as described in Examples 1–5. The results are shown in TABLE IV. The data in TABLE IV show that although the adhesive was activated after exposure to plasticized PVC, the adhesion ratings were not as high as those obtained for Comparative Examples B and C in TABLE II.

Comparative Examples D-1H, E-1H and F-1H were independently applied to Sheeting B2 as described in Comparative Examples A–C and heated in a 66° C. (150° F.) oven for 5 minutes; little adherence of the adhesive to Sheeting B2 was observed.

TABLE IV

| Comparative Ex. No. | Application Temperature | Application Time | Adhesion Rating |
|---|---|---|---|
| E-1 | RT | 30 min | 2 |
| F-1 | RT | 30 min | 2 |
| E-5 | RT | 30 min | 1.5 |
| F-5 | RT | 30 min | 2 |
| E-1 | 93° C. | 15 min | 3+ |

TABLE IV-continued

| Comparative Ex. No. | Application Temperature | Application Time | Adhesion Rating |
|---|---|---|---|
| F-1 | 93° C. | 15 min | 3+ |
| E-5 | 93° C. | 15 min | 3+ |
| F-5 | 93° C. | 15 min | 3+ |

Comparative Examples G–H

Adhesion on Heated Plasticized PVC

Comparative Examples G and H were prepared as described for Comparative Examples B and C, respectively, except that the knife coating orifice was 330 micrometers (13 mils) for Comparative Example G and 280 micrometers (11 mils) for Comparative Example H and adhesive drying times were 5 minutes at room temperature, 5 minutes at 66° C. (150° F.) and 5 minutes at 121° C. (250° F.). The dry adhesive thickness was 76 microns (3 mils) for both adhesives.

Sheeting construction samples of Comparative Examples G and H were prepared as described in Comparative Examples A–C and were applied to plasticized PVC pieces at 93° C. (200° F.) and maintained at that temperature for 15 minutes. After cooling to room temperature, the adhesion of the sheetings constructions to the plasticized PVC was measured using the 90° Peel Force Test described below.

Pieces of plasticized PVC, each about 5 cm by 10 cm, were cut from a 71 cm in height standard wide body traffic cone commercially available from Work Area Protection, Lake Charles, Ill. ("Cone Type 1") and from a 71 cm in height standard wide body traffic cone commercially available from Radiator Specialty Company, Charlotte, N.C. ("Cone Type 2") and were heated in a 93° C. (200° F.) oven for 10 minutes. At approximately 0, 2, 5, 8, and 15 minutes after removal of each plasticized PVC piece from the oven, sheeting construction samples, each about 4 cm by 9 cm, of Comparative Example G and Comparative Example H were independently applied to the warm plasticized PVC pieces. The times were chosen to simulate a range in times and temperatures at which cone collars are applied to traffic cones after removal from the molds in the cone manufacturing process. Following application, the samples were allowed to cool to room temperature, at which time the sample was prepared for the 90° Peel Force Test performed as described below.

The 90° Peel Force Test was performed on sheeting constructions adhesively bonded to plasticized PVC by cutting a 2.5 cm by 9 cm piece of sheeting free of excess sheeting on either side and loosening an end of the sheeting from the plasticized PVC substrate using a razor blade. The sample was placed in a fixture and the fixture was clamped in the lower jaw of a Sintech 1 tensile testing apparatus (MTS, Eden Prairie, Minn.). The sample was held so that a 2.5 cm (1 inch) wide strip of sheeting, with its loose end clamped in the upper jaw, was pulled away from the plasticized PVC at a 90° angle. A crosshead speed of 30.5 cm/minute (12 inch/minute) was used. The peel force was recorded in grams/cm (pounds/inch.).

The results are set out in TABLE V and show a range in peel adhesion values with generally higher values at higher application temperatures.

TABLE V

| Comp. Ex. No. | Cone Type | Minutes After Removal From 93° C. Oven | Application Temperature | Peel Adhesion (g/cm; lb/inch) |
|---|---|---|---|---|
| G | 1 | 0 | 93° C. (200° F.) then heated for 15 minutes at 93° C. | 1290; 7.22 |
| G | 1 | 0 | 74° C. (165° F.) | 732; 4.10 |
| G | 1 | 2 | 66° C. (150° F.) | 679; 3.58 |
| G | 1 | 5 | 55° C. (131° F.) | 514; 2.88 |
| G | 1 | 8 | 51° C. (123° F.) | 661; 3.70 |
| G | 1 | 15 | 36° C. (97° F.) | 720; 4.03 |
| G | 2 | 0 | 65° C. (149° F.) | 595; 3.33 |
| G | 2 | 2 | 50° C. (122° F.) | 945; 5.29 |
| G | 2 | 5 | 36° C. (96° F.) | 620; 3.47 |
| G | 2 | 8 | 32° C. (90° F.) | 389; 2.18 |
| G | 2 | 15 | — | — |
| H | 1 | 0 | 93° C. (200° F.) then heated for 15 minutes at 93° C. | 1568; 8.77 |
| H | 1 | 0 | 74° C. (165° F.) | 748; 4.19 |
| H | 1 | 2 | 66° C. (150° F.) | 625; 3.50 |
| H | 1 | 5 | 55° C. (131° F.) | 570; 3.19 |
| H | 1 | 8 | 51° C. (123° F.) | 571; 3.20 |
| H | 1 | 15 | 36° C. (97° F.) | 566; 3.17 |
| H | 2 | 0 | 65° C. (149° F.) | 648; 3.63 |
| H | 2 | 2 | 50° C. (122° F.) | 641; 3.59 |
| H | 2 | 5 | 36° C. (96°) | 402; 2.25 |
| H | 2 | 8 | 32° C. (90° F.) | 568; 3.18 |
| H | 2 | 15 | 27° C. (80° F.) | 713; 3.99 |

— Not tested.

Examples 6–7

Adhesive Precursors as Particles on Adhesive

The sheeting constructions of Examples 6 and 7 were prepared as described for Comparative Examples B and C, respectively. Adhesive Precursor was independently uniformly spread using a dry paintbrush on the exposed adhesives of Examples 6–7. The application of Adhesive Precursor substantially reduced the initial tack of the adhesive to about the same degree as the use of silica or talc used in Examples 1–5.

Samples of the sheeting construction of Example 6 were folded adhesive side to adhesive side and heated in a 66° C. (150° F.) oven for 15 minutes. The samples were removed from the oven, allowed to cool to room temperature, and evaluated for adhesion by attempting to pull the adhered sheeting apart by hand. It was very difficult to pull the adhesive layers apart, indicating that a release liner or slip sheet would likely be required if cone collars were placed adhesive-side to adhesive-side for packaging, storage or shipment.

Cone collars were made from the sheeting construction of Example 7 and applied to plasticized PVC traffic cones which had been independently heated in a 66° C. (150° F.) and 93° C. (200° F.) oven. The collar slid over the 66° C. (150° F.) cone very easily and could be initially adjusted to give a wrinkle-free application. About 10 minutes after the collar had been applied to the cone, the adhesive had begun to adhere to the cone in a few areas, but the collar was still repositionable. The collar applied to the 93° C. (200° F.) cone also slid on easily and could be adjusted into its correct, wrinkle-free position within a few seconds. After 10 minutes the collar could not be moved and the majority of it was well adhered to the cone.

Example 8 and Comparative Example I

Adhesive Precursor Particles Applied on Adhesive as a Dispersion

The sheeting construction of Example 8 was prepared as described for Comparative Example C. The exposed adhesive was coated with Adhesive Precursor 2 using a Meyer bar (i.e., a wire-wound bar). The water was dried from the dispersion leaving adhesive precursor particles on the adhesive.

A sample of sheeting construction of Example 8 was pulled across a piece of plasticized PVC cone that had been heated in a 66° C. (150° F.) oven for 10 minutes. The adhesive could be easily moved around the plasticized PVC cone, but had enough tack to stay lightly adhered to the plasticized PVC. A room temperature weight was placed on the sheeting construction while it was against the warm plasticized PVC cone and the cone was allowed to cool at room temperature for 10 minutes. After 10 minutes, the sheeting construction could still be repositioned on the plasticized PVC.

Comparative Example I was prepared as described for Example 8, except without adhesive precursor particles applied to the adhesive. The sample was pulled across the same plasticized PVC cone heated in a 66° C. (150° F.) oven for 10 minutes. The sample was very sticky and would allow movement of no more than a few millimeters before it was too strongly adhered to the cone to be repositioned.

Example 9

Protrusions Formed on Adhesive Using a Structured Release Liner

A structured release liner prepared as described in Example 3 of U.S. Pat. No. 5,296,277 was used as the substrate on which to coat Adhesive B as described in Comparative Examples A–C. The adhesive was knife-coated through a 330 micrometers (13 mil) gap, dried at room temperature for 10 minutes, and the dried at 79° C. (175°) for 10 minutes. The adhesive on the liner was laminated to Sheeting B2 as described in Comparative Examples A–C. The sheeting construction was heated in a 79° C. (175° F.) oven for 10 minutes. A cone collar was then cut from the sheeting construction and joined with a strip of tape commercially available from 3M under the trade designation "VHB tape." The cone collar was successfully applied to a room temperature plasticized PVC traffic cone, with the collar sliding on fairly easily and having an adjustment period of a few seconds.

Comparative Examples J–L

Comparative Examples J–L were prepared from a cone collar die cut from Sheeting A. The cone collar was similar to that shown in FIG. 4 with the side edges (i.e., collar height) being 10–15 cm. The release liner was removed from the adhesive of Sheeting A and the side edges overlapped about 1–2.5 cm to form the collar. One collar of each Comparative Example was slid onto a traffic cone made of Cone Type 2 plasticized PVC, a 107 cm in height polyethylene ("PE") stacker cone commercially available from Roadmarker Company, Reno, Nev. and a 71 cm in height rubber cone (Model No. RM28AOR) commercially available from Radiator Specialty Company both at RT and immediately after removal of the cone heated in an 82° C. oven for about 30 minutes. The results in TABLE VI show that for all Comparative Examples, the adhesive on the collar came into contact with the cone prematurely, causing the collar to adhere to the cone prior to the designated location and with wrinkling

TABLE VI

| Comp. Ex. No. | Particles on Adhesive | Application Aid | Cone Composition | Adhesion Rating at Application Temperature | |
|---|---|---|---|---|---|
| | | | | RT | 82° C. |
| J | None | Plasticizer in cone composition | Type 2 PVC | * | * |
| K | None | None | PE | * | * |
| L | None | None | Rubber | * | * |

*Collar could not be slid over the cone without premature tack to the cone and wrinkling.

Examples 10–19 and Comparative Example M

Examples 10–19 and Comparative Example M were prepared as described in Comparative Examples J–L, except that about a 1.3 cm area along one side edge of the die cut cone collar remained covered with release liner. Particles were applied with a paintbrush to the exposed adhesive surface of Sheeting A. Excess particles were removed by brushing the adhesive surface with a stiff brush.

The remaining release liner was removed and collars were formed as described in Comparative Examples J–L. Collars were applied to Type 2 plasticized PVC cones at RT and immediately after removal from heating in a 82° C. oven for 30 minutes. For Examples 10–19, an application aid (in addition to the plasticizer in the cone composition) was immediately sprayed onto each cone in the area designated for application of the collar. For Comparative Example M, no application aid was applied in addition to the plasticizer in the cone composition.

The cone collar was slid onto the cone, brought to the desired location on the cone, and with a back and forth twisting motion was securely brought into place on the cone. The cones were allowed to remain at RT for 24 hours. Then the cone collar was slit with a razor blade and hand peeled back about 2.5–7.5 cm to evaluate adhesion. Adhesion of the sheeting construction to the cone was rated on a scale of 1 to 4 with 1 indicating no adhesion, 2 indicating poor adhesion, 3 indicating good adhesion, and 4 indicating excellent adhesion and that the sheeting construction could not be peeled off of the cone without destroying the sheeting.

The results in TABLE VII show that at least good adhesion was achieved with Examples 10–19 with the exception of Examples 15–16 (i.e., with silica particles) which showed slight adhesion. It is believed that better adhesion may have been achievable with the silica if a larger diameter size silica were used, since that may provide more spacing between particles which would allow the application aid to come in contact with the adhesive and create a better bond.

Comparative Example M in TABLE VII shows that no adhesion was obtained with the use of Adhesive Precursor as the particles on the adhesive and no application aid applied in addition to the plasticizer in the cone composition.

TABLE VII

| Ex. No. | Particles on Adhesive | Application Aid | Adhesion Rating at Application Temperature | |
|---|---|---|---|---|
| | | | RT | 82° C. |
| 10 | Talc-F | Dawn/H2O | 3.5 | 3.5 |
| 11 | Talc-F | IPA | 3.0* | 3.5 |
| 12 | Talc-F | Citrus Cleaner | 3.0 | 3.5 |
| 13 | Talc-F | Desk Cleaner | 3.0 | 3.5 |
| 14 | Talc-F | SANTICIZER | 3.5 | — |
| 15 | Silica-D | Dawn/H2O | 1.5 | — |
| 16 | Silica-D | SANTICIZER | 1.5 | — |
| 17 | Corn Starch | Dawn/H2O | 3.0 | — |
| 18 | Corn Starch | SANTICIZER | 3.0 | — |
| 19 | Corn Starch | IPA | 3.0 | — |
| M | Adhesive Precursor | Plasticizer in cone composition | 1.0 | — |

*Test performed twice with the second result being 3.5.
— Not tested.

Examples 20–27

Examples 20–27 were prepared as described for Examples 10–19 and Comparitive Example M. The results in TABLE VIII show that at least good adhesion was achieved at room temperature using a variety of pressure sensitive adhesives, a variety of particles on the adhesive, and a variety of application aids.

TABLE VIII

| Ex. No. | Sheeting | Adhesive | Particles on Adhesive | Application Aid | Adhesion Rating at RT Application |
|---|---|---|---|---|---|
| 20 | B | * | Talc-F | Dawn/H2O | 3.0 |
| 21 | B | * | Talc-F | IPA | 3.0 |
| 22 | D | * | Talc-F | Dawn/H2O | 3.5 |
| 23 | D | * | Talc-F | IPA | 3.5 |
| 24 | B2 | E | Adhesive Precursor | Plasticizer in cone composition | 4.0 |
| 25 | B2 | F | Talc-F | SANTICIZER | 3.0 |
| 26 | B2 | F | Talc-F | IPA | 3.0 |
| 27 | B2 | F | Adhesive Precursor | Plasticizer in cone Composition | 3.0 |

*Adhesive was the adhesive on the sheeting.

Examples 28–29

Examples 28–29 were prepared and adhesion evaluated as described for Examples 10–19 and Comparative Example M. The results in TABLE IX show that excellent adhesion at room temperature was achieved with each of the examples. The examples used Sheeting C which contained a heat activatable adhesive instead of a pressure sensitive adhesive as used in Examples 10–27. Examples 28–29 with heat activatable adhesive masked with Talc-F had such high adhesion that Sheeting C was destroyed when the adhesion was tested.

TABLE IX

| Ex. No. | Particles on Adhesive | Application Aid | Adhesion Rating at RT Application |
|---|---|---|---|
| 28 | Talc-F | IPA | 4.0 |
| 29 | Talc-F | Dawn/H2O | 4.0* |

*Test performed twice with the second result being 4.0.

Examples 30–36

Examples 30–36 were prepared and adhesion evaluated as described for Examples 10–19 and Comparative Example M, except that the cone composition was as set out in TABLE X. The results in TABLE X show that good adhesion was achieved at room temperature utilizing particles on the adhesive and application aids with a variety of cone compositions.

TABLE X

| Ex. No. | Adhesive | Particles on Adhesive | Application Aid | Cone Composition | Adhesion Rating at RT Application |
|---|---|---|---|---|---|
| 30 | A | Talc-F | SANTICIZER | Rubber | 3.0 |
| 31 | A | Talc-F | IPA | Rubber | 3.0 |
| 32 | A | Talc-F | SANTICIZER | PE | 3.0 |
| 33 | D | Talc-F | SANTICIZER | Rubber | 3.0 |
| 34 | D | Talc-F | SANTICIZER | PE | 3.0 |
| 35 | D | Adhesive Precursor | SANTICIZER | PE | 3.0 |
| 36 | E | Talc-F | Dawn/H2O | PE | 3.0 |

Comparative Examples N–P and Example 37

One sample of each of Comparative Examples N–P and Example 37 were prepared by laminating equilateral triangular samples, each about 2.5 cm per side, of nonwoven web to Sheeting A. Samples were laminated with a 5 cm (2 inches) wide hand roller. SANTICIZER was applied to a Type 2 plasticized PVC cone and the samples were placed onto the cone.

Samples of Comparative Examples N–P and Example 37 were evaluated for adhesion to plasticized PVC as described in Examples 10–19 and Comparative Example M and the results set out in TABLE XI.

The sample of Comparative Examples N-P showed no adhesion after 24 hours at room temperature. This may have been due to the fact that the nonwoven web had very closely spaced fibers (about 10% openness) and likely did not either allow for the flow of either the adhesive or application aid around the fibers or that the SANTICIZER formed a barrier between the cone surface and the nonwoven web.

Example 37 used a nonwoven web with more openly spaced fibers (about 50% openness) than that of Comparative Examples N–P. A first sample of the web of Example 37 of the size described above showed no adhesion after 24 hours at room at temperature. A second sample of the web of Example 37 in the form of a square of about 7.5 cm per side showed an adhesion of 2.0 after 15.5 hours. It is believed that closely spaced fibers allowed the adhesive and the application aid to flow through the more open nonwoven web and build adhesion to the cone.

TABLE XI

| (Comp.) Ex. No. | Nonwoven Web | Adhesion Rating at RT Application |
|---|---|---|
| N | Spunbond Polypropylene from Polymer Group Inc., North Charleston, SC (50.9 grams per square meter) | 1.0 |
| O | Wet lay Tencel fiber Napakon # 7468 from Paperfabrik Schoeller & Hoesch GmbH, Gernsbach/Murgtal, Germany | 1.0 |
| P | Tredegar Film Products X6582 Porous Film: 40 HEX VisPore film from Tredegar Company, Richmond, VA (32 micrometers caliper) | 1.0 |
| 37 | Cerex Spunbond Nylon from Cerex Advanced Fabrics, L.P. Pensacola, FL (basis weight 10.2 grams per square meter) | 2.0 |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of adhering an adhesive article to a substrate, the method comprising:
   providing an adhesive article comprising a surface on which is disposed an adhesive with a plurality of nontacky protrusions in the form of particles;
   applying the adhesive article to the substrate to form an interface between the adhesive and the substrate; and
   providing a fluid application aid to the interface between the adhesive and the substrate to promote adhesion between the adhesive article and the substrate, wherein the fluid application aid and the substrate each comprise a plasticizer and wherein the protrusions become tacky upon interaction with the application aid.

2. The method of claim 1 wherein the adhesive has a topologically structured surface comprising structured features.

3. The method of claim 1 wherein the adhesive article comprises a sheeting material having two major surfaces, one of which has an adhesive disposed thereon with a plurality of protrusions on the adhesive surface.

4. The method of claim 3 wherein the sheeting comprises retroreflective sheeting.

5. The method of claim 4 wherein the retroreflective sheeting is in the form of a cone collar.

6. The method of claim 1 wherein providing the fluid application aid comprises allowing the plasticizer to migrate out of the substrate.

7. The method of claim 1 wherein the protrusions cover about 10% to about 95% of the surface area of the adhesive.

8. The method of claim 1 wherein providing a fluid application aid to the interface between the adhesive and the substrate occurs simultaneously with applying the adhesive article to the substrate to form the interface.

9. The method of claim 8 wherein the fluid application aid is provided to the adhesive article, the substrate, or both prior to applying the adhesive article to the substrate.

10. A method of adhering an adhesive article to a substrate, the method comprising:
    providing an adhesive article comprising a surface on which is disposed an adhesive with a plurality of protrusions in the form of particles;
    applying the adhesive article to the substrate to form an interface between the adhesive and the substrate; and
    providing a fluid application aid to the interface between the adhesive and the substrate to promote adhesion between the adhesive article and the substrate, wherein the fluid application aid comprises water, an organic solvent, or combinations thereof and the fluid application aid and the substrate each comprise a plasticizer.

11. The method of claim 10 wherein the particles are selected from the group of silica, talc, starch, glass, alumina, calcium carbonate, zeolites, nontacky adhesive precursor particles, and comnbinations thereof.

12. The method of claim 10 wherein the protrusions are nontacky.

13. A method of adhering an adhesive article to a substrate, the method comprising:
    providing an adhesive article comprising a surface on which is disposed an adhesive with a plurality of protrusions in the form of particles;
    applying the adhesive article to the substrate to form an interface between the adhesive and the substrate; and
    providing a fluid application aid to the interface between the adhesive and the substrate to promote adhesion between the adhesive article and the substrate, wherein the fluid application aid comprises a mixture of plasticizer, water and a surfactant and the fluid application aid and the substrate each comprise a plasticizer.

14. The method of claim 13 wherein the particles are selected from the group of silica, talc, starch, glass, alumina, calcium carbonate, zeolitcs, nontacky adhesive precursor particles, and combinations thereof.

15. The method of claim 13 wherein the protrusions are nontacky.

16. A method of adhering an adhesive article to a substrate, the method comprising:
    providing an adhesive article comprising a surface on which is disposed a plasticizer-activatable adhesive with a plurality of plasticizer-activatablc adhesive protrusions, the plasticizer-activatable adhesive comprising a plasticizer-activatable pressure sensitive adhesive that comprise an over-tackified adhesive;
    applying the adhesive article to the substrate to form an interface between the adhesive and the substrate; and
    providing a fluid application aid to the interface between the adhesive and the substrate to promote adhesion between the adhesive article and the substrate.

17. The method of claim 16 wherein providing a fluid application aid to the interface between the adhesive and the substrate occurs simultaneously with applying the adhesive article to the substrate to form the interface.

18. The method of claim 16 wherein the fluid application aid is provided to the adhesive article, the substrate, or both prior to applying the adhesive article to the substrate.

* * * * *

UNITED STATES PATENT AND TRADEMARK OFFICE
CERTIFICATE OF CORRECTION

PATENT NO. : 6,656,319 B1
DATED : December 2, 2003
INVENTOR(S) : Boyd, William C.

It is certified that error appears in the above-identified patent and that said Letters Patent is hereby corrected as shown below:

<u>Title page,</u>
Item [56], References Cited, OTHER PUBLICATIONS, "Matchieng" should be -- Matching --.

<u>Column 3,</u>
Line 40, delete "to" following -- adhesive --.

<u>Column 9,</u>
Lines 51-52, start a new paragraph with "FIG. 5".
Line 67, "comer-based" should be -- corner-based --.

<u>Column 10,</u>
Lines 36, "(Bums)" should be -- (Burns) --.
Line 53, "(Bums)" should be -- (Burns) --.

<u>Column 12,</u>
Line 24, "AMERIEPOL" should be -- AMERIPOL --.

<u>Column 13,</u>
Line 7, delete "a" preceding "FORAL".
Line 41, "fuictionality" should be -- functionality --.
Line 47, "finctionality" should be -- functionality --.
Line 59, "tackifiing" should be -- tackifying --.

<u>Column 14,</u>
Line 47, "Acrvlate" should be -- Acrylate --.

<u>Column 15,</u>
Line 35, "Dahiquist" should be -- Dahlquist --.

<u>Column 18,</u>
Line 9, "monofuictional" should be -- monofunctional --.
Line 52, "fumctional" should be --functional--.

UNITED STATES PATENT AND TRADEMARK OFFICE
CERTIFICATE OF CORRECTION

PATENT NO.    : 6,656,319 B1
DATED         : December 2, 2003
INVENTOR(S)   : Boyd, William C.

It is certified that error appears in the above-identified patent and that said Letters Patent is hereby corrected as shown below:

Column 19,
Line 10, "iphenylphosphate" should be -- diphenylphosphate --.
Line 33, "art" should be -- are --.

Column 21,
Line 34, "ariety" should be --variety --.
Line 35, "an" should be -- can --.
Line 37, "lass," should be -- glass --.
Line 38, "ubstrates" should be -- substrates --.
Line 65, "polyarnides" should be -- polyamides --.

Column 24,
Line 1, "fumnel" should be -- funnel --.
Line 55, "finned" should be -- fumed --.
Line 56, "EL" should be -- IL --.
Line 58, "flumed" should be -- fumed --.

Column 25,
Line 36, "H2O" should be -- $H_2O$ --.

Column 30,
Lines 38-39, "unifonnly" should be -- uniformly --.

Column 33,
Lines 10-15 "H2O" should be -- $H_2O$ --.
Line 29, "Comparitive" should be -- Comparative --.
Lines 40-42, "H2O" should be -- $H_2O$ --.

UNITED STATES PATENT AND TRADEMARK OFFICE
CERTIFICATE OF CORRECTION

PATENT NO. : 6,656,319 B1
DATED : December 2, 2003
INVENTOR(S) : Boyd, William C.

It is certified that error appears in the above-identified patent and that said Letters Patent is hereby corrected as shown below:

Column 34,
Line 7, "H2O" should be -- $H_2O$ --.
Line 62, delete "at" following "room".
Line 65, insert -- the less -- following "that".

Column 36,
Line 21, "comnbinations" should be -- combinations --.
Line 39, "zeolitcs" should be -- zeolites --.
Line 47, "activatablc" should be -- activatable --.

Signed and Sealed this

Eleventh Day of May, 2004

JON W. DUDAS
*Acting Director of the United States Patent and Trademark Office*